(12) United States Patent
Jenkins et al.

(10) Patent No.: US 8,323,013 B2
(45) Date of Patent: Dec. 4, 2012

(54) SYSTEM FOR CHANGING SIPE BLADES FOR MOLDING OR RETREADING TIRES

(75) Inventors: Brian Williams Jenkins, Greenville, SC (US); Gildas Yvon DeStaercke, Simpsonville, SC (US); James F. Garrett, Simpsonville, SC (US); Ronald Cress, Simpsonville, SC (US)

(73) Assignee: Michelin Recherche et Technique S.A. (CH)

( * ) Notice: Subject to any disclaimer, the term of this patent is extended or adjusted under 35 U.S.C. 154(b) by 31 days.

(21) Appl. No.: 13/126,227

(22) Filed: Apr. 27, 2011

(65) Prior Publication Data

US 2012/0161348 A1  Jun. 28, 2012

Related U.S. Application Data

(63) Continuation of application No. PCT/US2009/032079, filed on Jan. 27, 2009.

(51) Int. Cl.
*B29D 30/06* (2006.01)
*B29C 33/42* (2006.01)

(52) U.S. Cl. ........ 425/20; 425/28.1; 425/470; 29/426.1; 29/428; 29/469

(58) Field of Classification Search ............. 425/20, 425/25, 28.1, 46, 193, 470; 264/326; 29/426.1, 29/428, 469
See application file for complete search history.

(56) References Cited

U.S. PATENT DOCUMENTS

| | | | |
|---|---|---|---|
| 2,569,080 A | | 9/1951 | Trimble et al. |
| 2,587,297 A | * | 2/1952 | Duerksen .................... 425/28.1 |
| 2,593,547 A | | 4/1952 | Duerksen |
| 2,983,004 A | | 5/1961 | Spier et al. |
| 3,553,790 A | | 1/1971 | Brobeck et al. |
| 3,912,437 A | | 10/1975 | Hujik |
| 3,954,344 A | | 5/1976 | Nakama |
| 4,053,265 A | | 10/1977 | Wulker et al. |
| 4,553,918 A | | 11/1985 | Yoda et al. |

(Continued)

FOREIGN PATENT DOCUMENTS

JP   2007-190803 A   1/2006

OTHER PUBLICATIONS

International Search Report and Written Opinion for PCT/US2009/032079 dated Mar. 23, 2009.

*Primary Examiner* — James Mackey
(74) *Attorney, Agent, or Firm* — Kurt J. Fugman

(57) ABSTRACT

An improved system for changing sipe blade configurations on equipment for the manufacture of tires is provided. This system allows the replacement of damaged sipe blades, the replacement of sipe blades of one configuration with those of another configuration, and the elimination of a sipe blade altogether. Certain embodiments allow sipe blades to be changed by providing a sipe blade that is held by a blade holder with a slit in its heel that allows a compact assembly of the sipe blade and blade holder that is easy to manufacture. Other embodiments allow sipe blades that have an undercut in the direction of draw in, their midportion and side portions without undercuts to be easily made and installed. Finally, other embodiments allow for the effective replacement and fabrication of sipe blades that have undercuts in the direction of draw that blend into other projections found on a curing member.

30 Claims, 15 Drawing Sheets

U.S. PATENT DOCUMENTS

| | | | |
|---|---|---|---|
| 5,247,151 A | 9/1993 | Hagerman | |
| 5,417,133 A | 5/1995 | Bakermans et al. | |
| 6,138,982 A * | 10/2000 | Bellot | 249/91 |
| 6,196,818 B1 | 3/2001 | Coleman et al. | |
| 6,264,453 B1 | 7/2001 | Jacobs et al. | |
| 6,382,943 B1 | 5/2002 | Metz et al. | |
| 6,491,854 B1 | 12/2002 | Sano | |
| 6,827,566 B1 | 12/2004 | Root et al. | |
| 7,143,799 B2 | 12/2006 | Collette et al. | |
| 7,874,821 B2 * | 1/2011 | Ohara | 425/28.1 |
| 2007/0187117 A1 | 8/2007 | Tanaka et al. | |
| 2008/0003321 A1 | 1/2008 | Kerr et al. | |

* cited by examiner

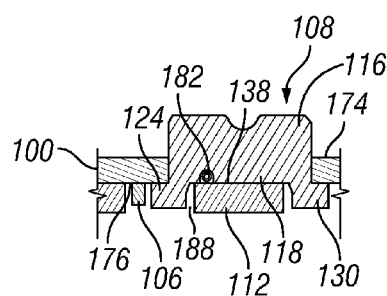
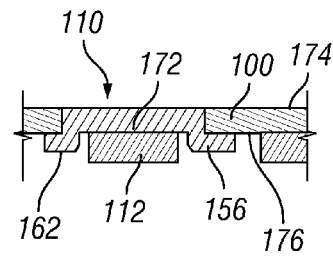
FIG. 4A          FIG. 4B
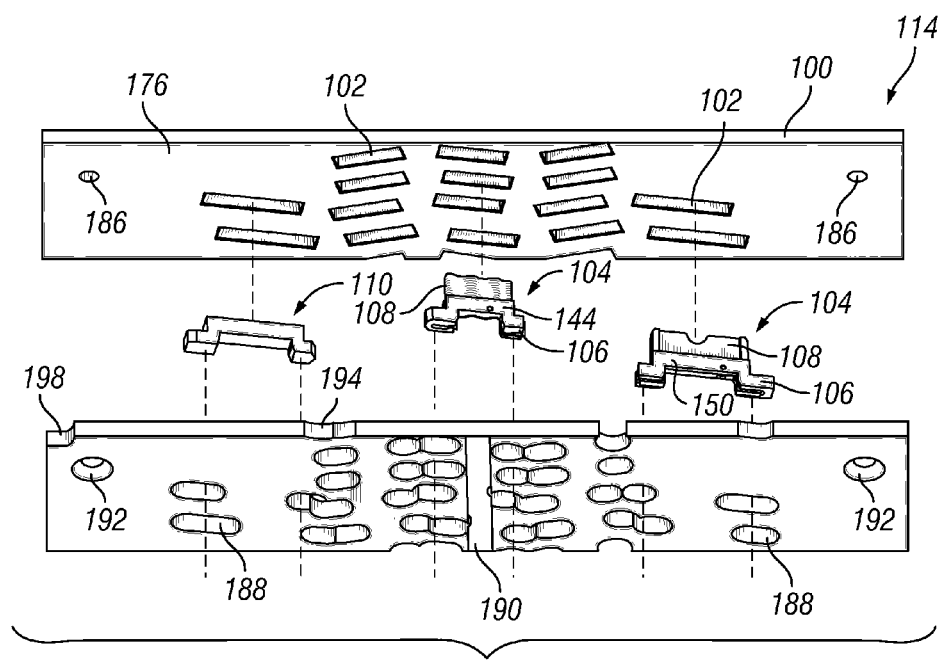
FIG. 5

SYSTEM FOR CHANGING SIPE BLADES FOR MOLDING OR RETREADING TIRES

This application is a Continuation of International Application PCT/US2009/032079, filed on 27 Jan. 2009.

BACKGROUND OF THE INVENTION

1. Field of the Invention

This invention relates generally to an apparatus for molding or retreading the tread stock of a tire, and more specifically, to a system for readily replacing sipe blades in such an apparatus with those having a different configuration, for replacing worn or broken sipe blades, or for eliminating a sipe blade altogether.

2. Description of the Related Art

Molds and retread presses are types of equipment that are used to form features such as grooves, recesses, tread blocks, and sipes or lamellas on the tread stock of a tire. Sipes or lamellas are thin slits in the tread stock of a tire that enhance certain characteristics of the tire such as handling. Sipes are formed by thin projections or blades that extend from a curing surface of a mold or of a plate found in a retread press. In a molding situation, a new tire is placed in the mold and then the mold sectors which form the tread stock of the tire move in until projections such as sipe blades form the desired geometry on the tread stock. When forming a sipe, the blade penetrates the tread stock as the mold sectors move toward the tire. Once the mold sectors have moved completely into a closed position, the curing surfaces of the mold sectors are in contact with the tread stock of the tire and the top portion of the mold is closed such that the complete tire is encapsulated within the mold. The mold then supplies heat to the tread stock partially by conduction through the curing surfaces of the mold sectors to the exterior of the tire while heat is conducted to the interior of the tire via the membrane. This heats the rubber of the tire until it vulcanizes, leaving the geometry permanently embossed on the tire.

On the other hand, the retreading process is used to replace the tread on a used tire. First, the worn tire tread stock is removed from the tire. Second, new tire tread stock with the proper geometry is formed by placing a flat piece of tread stock in a retread press that has sipe blades and other projections found on a curing plate that has been installed into the press. The press is then closed until the sipe blades and other projections engage the tread stock and the curing plate presses up against the tread stock. Sometimes sipe blades are located on the top portion of the retread press when the sipes are intended to open up to the interior of the tire. Other times the blades are found on the bottom portion of the press when the sipes are intended to face toward the exterior of the tire. Heat is then conducted to the tread stock from both the bottom and top plates of the press until the rubber vulcanizes, leaving the geometry permanently embossed on the tread stock. Finally, the new tread stock is attached to the circumference of the tire.

When forming sipes on tread stock, regardless of whether it is by the molding or retreading processes, the sipe blades that form the sipes are thin and subject to repeated stress. Accordingly, these blades can become worn or broken. Therefore, there is a need to replace worn or broken blades with new blades. Also, different types of tires have different geometry on their tread stock with different features necessitating that sipe blades with different configurations be used. Also, the pattern in which sipe blades or other projections are arranged needs to be changed to produce different types of tires. As a result, there has also been a need to mold and retread tread stock with different features. One way to accomplish this is to have dedicated molds and curing plates with sipe blades and other projections permanently attached to them so that different types of tires can be manufactured. However, it is often cost prohibitive to make a dedicated mold sector or curing plate for every type of tire, especially in situations where a certain type of tire is produced in limited volumes. In such situations, it is preferable to have a mold sector or curing plate that can be changed over from one configuration to another, so that different features and/or sipe blade patterns and configurations can be embossed onto a tread stock using essentially the same apparatus. Therefore, it is desirable to have a system for molding or retreading tires that allows such a changeover. Finally, it would be desirous to provide a system that creates this changeover in a foolproof manner, prohibiting the assembler from creating incorrect geometry for producing a particular tire that would result in scrap and lost profits. Fool proofing can also prevent mold and press crashing caused by components of one side of an apparatus hitting the other side of the apparatus because components are improperly oriented or located, which is an undesirable expense.

Sipe blades come in two different basic configurations. The first type is called a two dimensional sipe blade, so called because its geometry varies in a plane that is parallel to the curing surface of a curing plate in the retreading application, or a plane that is perpendicular to the radius of the tire in a molding application. The geometry of a two dimensional sipe blade does not vary or is straight in the direction of draw for the sipe blade. The direction of draw is the direction a sipe blade moves to withdraw from the tread stock after the sipe has been formed. In the molding process, the draw direction is in a generally outward radial direction of the tire. In the retreading process, the draw direction is perpendicular to the curing surface and away from the tread stock. The second type of sipe blade is a three dimensional sipe blade and has geometry that varies both in a plane that is parallel to the draw direction and a plane that is perpendicular to the draw direction. An undercut is formed by a three dimensional sipe blade because of its geometrical variation in the direction of draw which can result in a larger force being necessary to withdraw the three dimensional sipe blade from the tread stock.

For reference, the spatial relationship between different features in this specification and the claims will be measured in the anti-draw direction which is parallel and opposite to the draw direction (see FIG. 2 which shows the anti-draw direction as Arrow A). Accordingly, features that are located further in the anti-draw direction than others will be referred to as being "above" them. Likewise, features that are located further in the draw direction than others will be referred to as being "below" them. Similarly, the surface of a feature that is located furthest in the anti-draw direction will be referred to as being the "top" surface. On the other hand, the surface of a feature that is located furthest in the draw direction will be referred to as being the "bottom" surface.

FIGS. 1 and 2 disclose an apparatus that attempts to satisfy some of the aforementioned needs. Although it involves the use of a flat retreading press, it is to be understood that this apparatus could be easily modified to be used with a round mold for making a new tire or retreading an existing tire as well. This apparatus comprises a curing plate 50 that has a slit 52 formed in it using a wire EDM process. The slit 52 is configured to be complimentary to the shape of a two dimensional sipe blade 54 that is to be inserted through the bottom surface 56 of the curing plate 50 until the molding portion 58 of the sipe blade 54 has extended through the slit 52 and rises above the curing surface 60. The gap between the blade 54 and the slit 52 is about six and a half hundredths of a millimeter on a side of the blade 54 on average in order to prevent the rubber from flashing into the recess during curing. As can be seen, the blade 54 has two heels 62 that extend from its retention portion 64, which contact the bottom 56 of the curing plate 50, preventing the sipe blade 54 from passing through the curing plate 50. A piece of the retention portion 64 of the sipe blade 54 is cut out, separating the two heels 62 and forming a clamp surface 66 that is found above the bottom surface 68 of the heels 62 and which is coplanar with top surface 70 of the heels 62. Hence, the clamp surface 66 of the sipe blade 54 is flush with the bottom surface 56 of the curing plate 50 when the top surfaces 70 of the heels 62 contact the bottom surface 56 of the curing plate 50, leaving only the heels 62 extending below the curing plate 50. A retainer plate 72 with apertures 74 configured to clear the heels 62 is mounted to the curing plate 50, pressing onto the clamp surface 66 of the sipe blade 54 and capturing it between both plates.

This design allows two dimensional sipe blades 54 to be removed when worn or broken by simply disconnecting the retainer plate 72 from the curing plate 50 and pulling the sipe blade 54 back out of the slit 52. However, this design has several drawbacks. First, the slit 52 is wired directly into the curing plate 50 which means only another sipe blade 54 that has the same two dimensional variation in its geometry can be used in that slit 52. So this design does not allow a changeover to another sipe blade 54 having another configuration. Second, this design does not easily allow for a sipe blade 54 to be eliminated as the slit 52 will allow rubber to seep into it when no sipe blade 54 is present. Third, this design does not work for three dimensional sipe blades since the molding portions of these blades are larger than those of two dimensional sipe blades 54 and they cannot fit through the small slit 52 that accommodates two dimensional sipe blades 54.

Accordingly, there still exists a need for a system that allows all sipe blade configurations, including two and three dimensional, to be changed out for sipe blades having other configurations in molding or retreading processes and to selectively eliminate a sipe blade if so desired.

SUMMARY OF THE INVENTION

The present invention includes an apparatus that can be used in molding or retreading a tire and that also allows sipe replacement. The apparatus has the following components. First, there is a curing member that has a top surface that contacts the tread stock of the tire, a bottom surface, and an aperture that extends from the top surface to the bottom surface. Second, there is a blade holder that is configured to fit within the aperture of the curing member and that also has a body that defines a slit with a predetermined configuration and a top surface that contacts the tread stock. A heel is attached to the body of the blade holder that has a top surface, which contacts the curing member, and a bottom surface. Third, there is a sipe blade with a first portion for forming a sipe in the tire tread and a second portion for retaining the blade within the apparatus comprising a heel with a top surface and a bottom surface. The second portion of the sipe blade has a shape that is complimentary to the slit of the blade holder so that the sipe blade can fit within the blade holder. Also, the slit of the blade holder may extend into its heel and the second portion of the sipe blade may at least be partially located within the heel of the blade holder. Either of the heels of the sipe blade or blade holder may contact the curing member.

The present invention also includes an apparatus for molding or retreading a tire having sipes in its tread stock that has fool proofing characteristics for assembling the apparatus. The apparatus has the following components and features. First, there is a blade holder that has a predetermined configuration with a top surface that contacts the tire tread and a body that defines a slit with a predetermined configuration. The body also defines a hole that extends from the exterior of the blade holder to the slit. Second, there is a stop member disposed in the hole of the blade holder that extends into the slit of the blade holder. Third, there is a sipe blade that has a first portion for forming the sipe in the tire tread and a second portion that is shaped complimentary to the slit of blade holder so it can be contained within the blade holder. The sipe blade also has a slot with an open end and a closed end that is located and configured to receive the stop member. The location of the hole of the blade holder may be off-centered with respect to its body and the slot of the sipe blade may also be off-centered with respect to its body so that the sipe blade can only be fully inserted into the blade holder in a single orientation.

Yet another embodiment of the present invention provides a way to form sipes with undercuts in the direction of draw that blends into a groove found on a tread stock. The apparatus comprises a curing member with a top surface that contacts the tread, a bottom surface, and an aperture that extends from the top surface to the bottom surface. It also includes a sipe blade with a first portion that forms a sipe in the tread and a second portion that is contained within the apparatus. The first portion has an undercut in the direction of draw characterized by a male or female portion on the front surface of the sipe blade. There is also a blade holder that has a body with a bottom curing surface and a first spire that rises from the bottom curing surface to a top curing surface, said blade holder having a front surface that is configured to mate with an interior surface of the aperture of the curing member and a rear surface with a male or female portion that is complimentary to the male or female portion of the undercut of the sipe blade when the rear surface of the first blade holder is pressed against the front surface of the sipe blade so that there is no gap between the blade holder and sipe blade, preventing flash.

The sipe blade may also have an undercut in the direction of draw that is characterized by a male or female portion on the rear surface of the sipe blade. A second blade holder may then also be provided that has a body with a bottom curing surface and a first spire that rises from the bottom curing surface to a top curing surface, said second blade holder having a front surface that is configured to mate with an interior surface of the aperture of the curing member and a rear surface with a male or female portion on the spire that is complimentary to the male or female portion of the sipe blade when the rear surface of the second blade holder is pressed against the rear surface of the sipe blade so that there is no gap between the blade and blade holder, preventing flash.

The present invention also provides a method for assembling and disassembling an apparatus for molding or retreading tires comprising the following steps. One step is providing a curing member with a top or curing surface, bottom surface and an aperture that extends from the top surface to the bottom surface. Another step is providing a blade holder with a slit found on its top or curing surface. Yet another step is providing a sipe blade with a first portion for molding or forming a sipe in the tread stock of a tire and a second portion that fits within the slit of the blade holder. Next, the assembler inserts the sipe blade into the slit of the blade holder by passing the sipe blade through the curing surface of the blade holder. Then the assembler inserts the sipe blade and blade holder into the aperture of the curing member. This may be accomplished by passing them through the bottom surface of the curing member into its aperture. Finally, the blade holder and sipe blade are retained in the curing member.

This method may also include the steps of removing any means retaining the blade holder and sipe blade in the apparatus and extracting the blade holder and sipe blade from the curing member. This may be accomplished by sliding them out of the aperture through the bottom surface of the curing member. This method further comprises the step of extracting the sipe blade from the blade holder out of its slit through its curing surface. These extractions are performed without damaging the sipe blade.

The foregoing and other objects, features and advantages of the invention will be apparent from the following more detailed descriptions of particular embodiments of the invention, as illustrated in the accompanying drawing wherein like reference numbers represent like parts of the invention.

BRIEF DESCRIPTION OF THE DRAWINGS

FIG. 4A is a cross-sectional view of the apparatus of FIG. 4 taken along line 4A-4A thereof showing a sipe blade/blade holder subassembly held in the apparatus;

FIG. 4B is a cross-sectional view of the apparatus of FIG. 4 taken along line 4B-4B thereof showing a dummy insert held in the apparatus;

FIG. 5 is an exploded assembly view of the apparatus of FIG. 3 with some sipe blade/blade holder subassemblies and dummy inserts removed to enhance clarity;

DETAILED DESCRIPTION OF PARTICULAR EMBODIMENTS

Figure 1:
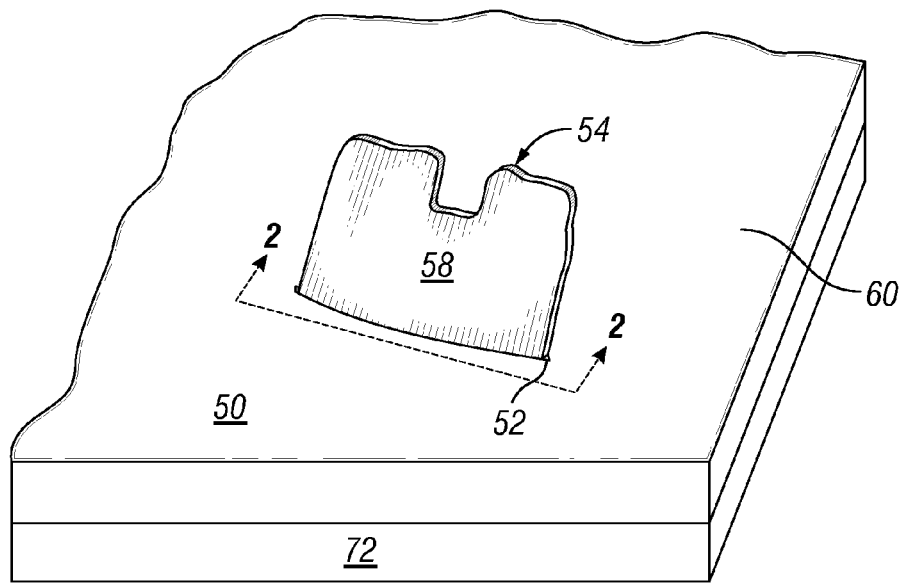
FIG. 1 is a perspective view of a prior art apparatus showing a method for replacing sipe blades in a molding or retreading apparatus.
Figure 2:
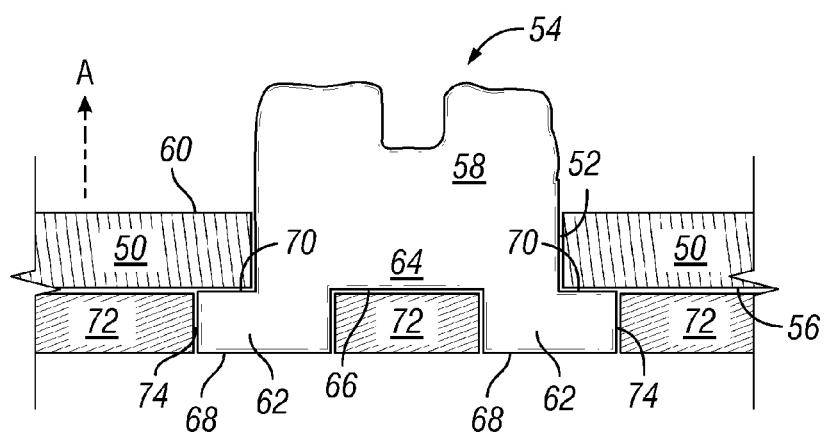
FIG. 2 is a cross-sectional view of the prior art apparatus of FIG. 1 taken along line 2-2 thereof.

Looking at FIGS. 3 thru 6, there is shown the first embodiment of the present invention. It comprises, in part, a curing plate 100 with a series of apertures 102 that are configured to receive a subassembly 104 that includes a drawer or blade holder 106 and a sipe blade 108. Alternatively, a dummy drawer or insert 110 may be placed into the aperture 102 so that no sipe blade 108 is found in that spot. Once the desired blade holders 106, sipe blades 108, and dummy inserts 110 have been properly placed, the retainer plate 112 is mounted onto the curing plate 100, forming a plate subassembly 114 that can be inserted into a retread press to form a particular type of tire. Alternatively, the curing plate could be curved such as is common with a mold sector that is installed in a mold for forming new tires or retreading existing tires.

Figure 6:
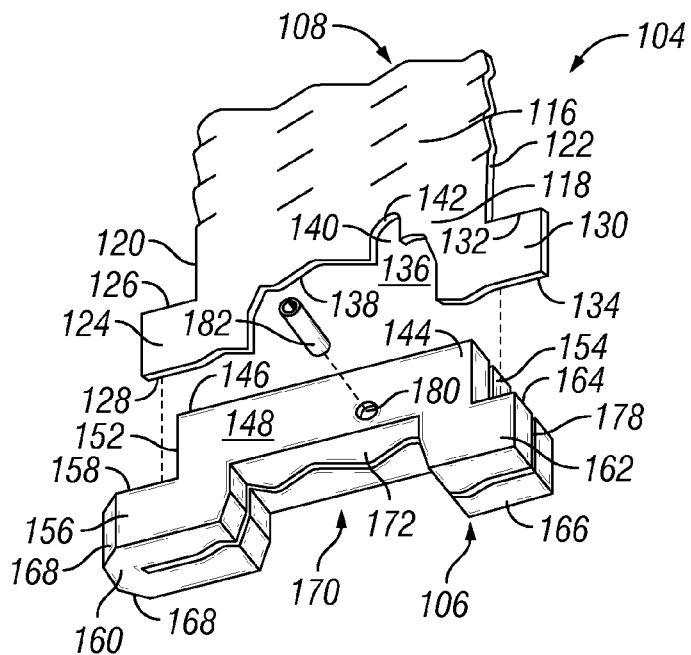
FIG. 6 is an exploded assembly view of sipe blade/blade holder subassembly of the apparatus of FIG. 3.

Focusing on FIG. 6, the features and construction of the blade holder 106 and sipe blade 108 can be clearly seen. The sipe blade 108 is constructed from a thin piece of metal having an exemplary thickness of six tenths of a millimeter for truck tire applications but it is contemplated that this thickness could be less such as two tenths of a millimeter for car tire applications. The sipe blade has a first portion 116 that forms the sipe in the tire tread and a second portion 118 that is used to retain the blade 108 in the apparatus. This particular sipe blade 108 is a three dimensional sipe blade as its first portion 116 forms an undercut in the direction of draw while its second portion 118 varies only in a plane that is perpendicular to the direction of draw. The sipe blade 108 also has a first side surface 120 next to the first and second portions 116, 118 of the blade 108 and a second side surface 122 that is next to the first and second portions 116, 118 of the blade 108 and that faces in the opposite direction. A first heel 124, with a top surface 126 and bottom surface 128, is attached to the first side surface 120 next to the second portion 118 of the blade 108 and extends a predetermined distance away from the first side surface 120.

Likewise, a second heel 130, with a top surface 132 and bottom surface 134, is attached to the second side surface 122 next to the second portion 118 of the blade 108 and extends a predetermined distance away from the second side surface 122. The distance between the top and bottom surfaces 126, 128 of the first heel 124, which defines the height of the first heel 124, is the same as the distance between the top and bottom surfaces 132, 134 of the second heel 130, which defines the height of the second heel 130. Furthermore, the top surfaces 126, 132 of the heels 124, 130 are coplanar as are their bottom surfaces 128, 134. A section 136 that is approximately centered on the second portion 118 of the blade 108 is removed, forming a clamp surface 138 that is coplanar with the top surfaces 126, 132 of the heels 124, 130. A slot 140 that has a closed end 142 extends down vertically in the second portion 118 of the blade 108 and opens onto the clamp surface 138. The slot 140 is positioned in an off-centered manner with respect to the body of the sipe blade 108.

The sipe blade 108 is manufactured in the following manner. First, the lateral profile of the blade 108, including the slot 140 is stamped using a die or burnt using a wire EDM. The two dimensional variation is then stamped onto both the first and second portions 116, 118 of the blade 108. Finally, the three dimensional variation is stamped onto the first portion 116 of the blade 108 only. The last step is skipped when forming two dimensional sipe blades. Alternatively, the first and second portions 116, 118 of the blade 108 could have the two dimensional variation stamped onto them first and the profiles could then be punched out or burnt using a wire EDM.

Sipe blades are typically made from stainless steel but may be made from other materials having the desired strength and durability. Furthermore, the shape and configuration of the sipe blade 108 may be altered and still fall within the scope of the present invention. For example, the size of the heels 124, 130, their respective heights, and the distances they extend from the sipe blade 108 may be different from each other. The location and size of the section 136 removed from the second portion 118 of the blade 108 may also be changed so that clamp surface 138 is no longer coplanar with one or both of the top surfaces 126, 132 of the heels 124, 130 and so that the section 136 is no longer centered with respect to the body of the blade 108. Also, the location of the slot 140 can vary across the width of the sipe blade 108 so that it does not open up onto the clamp surface 138 but onto another bottom surface of the sipe blade 108. Furthermore, the first and second portions of the sipe blade may follow a curved path or have other shapes that are not straight.

The blade holder 106 has a main body 144 with a rectangular perimeter as viewed from its top or curing surface 146, so called, because this surface 146 contacts the tire tread when installed in a retread press or mold sector and conducts heat to the rubber to vulcanize it. The perimeter of the main body 144 is defined, in part, by a front planar face 148 and a rear planar face 150 that are parallel and face in opposite directions. The distance between them constitutes the short dimension of the rectangular perimeter. The perimeter is also defined by a first planar side face 152 and a second planar side face 154 that are also parallel and face in opposite directions. The distance between them constitutes the long dimension of the rectangular perimeter. As a result of this geometry, the cross-section of the main body 144 is also rectangular. The perimeter is configured so that it will fit complimentarily and snugly within an aperture 102 of the curing plate 100 with less than six and a half hundredths of a millimeter clearance on average between the interior surface of the aperture 102 and the perimeter of the blade holder 106 to prevent flashing. A first heel 156, with a top surface 158 and a bottom surface 160, is attached to the main body 144 and extends a predetermined distance away from the first side surface 152. A second heel 162, with a top surface 164 and a bottom surface 166, is attached to the main body 144 and extends a predetermined distance away from the second side surface 154. The first heel 156 extends further away from the first side surface 152 than the second heel 162 extends away from the second side surface 154 and the vertical edges of both heels 156, 162 may have chamfers 168. Some chamfers may exist for clearing other blade holders or sipe blades. Other chamfers exist to differentiate the blade holders so an assembler knows what orientation to install the blade holders for fool proofing before attaching the retaining member.

A gap 170 is located between the heels 156, 162, which creates the bottom or clamp surface 172 of the main body 144 of the blade holder 106. The top surfaces 158, 164 of the heels 156, 162 are coplanar with the clamp surface 172 and the bottoms surfaces 160, 166 of the heels 156, 162 are coplanar with each other. The distance between the curing surface 146 and clamp surface 172 of the blade holder 106 is the same as the thickness of the curing plate 100 so that the main body 144 of blade holder 106 is flush with the top and bottom surfaces 174, 176 of the curing plate 100. When the blade holder 106 is inserted into the curing plate 100, only the heels 156, 162 of the blade holder 106 extend past the bottom of the curing plate 100 with the top surfaces 158, 164 of the heels 156, 162 resting against the bottom surface 176 of the curing plate 100, preventing the blade holder 106 from passing through the curing plate 100.

A slit 178 is centrally located in the main body 144 and extends into the first heel 156 and completely through the second heel 162, substantially creating a u-shaped body as viewed from the curing surface 146. The shape of the slit 178 is complimentary to the second portion 118 of the sipe blade 108 so that the blade 108 can fit snugly within the slit 178. Although the slit is shown to follow a substantially linear path, it is possible that its could follow a curved path such as when the first portion of the sipe blade is curved. Typically, the heels 124, 130 of the sipe blade 108 will be located within the heels 156, 162 of the blade holder 106 and will be at least partially coextensive with the heels 156, 162 of the blade holder 106. This construction is advantageous because it allows the sipe blade/blade holder subassembly 104 to take up as little room as possible, maximizing the number of subassemblies 104 that can be located in close proximity to each other. A hole 180 penetrates the body 144 of the blade holder 106 and passes through the front and rear faces 148, 150 of the blade holder 106 as well as the slit 178. A stop member in the form of a roll pin 182 can be inserted into the hole 180 so that it passes from one side of the slit 178 to the other. The roll pin 182 prevents any sipe blade 108 from being inserted into the slit 178 from underneath the blade holder 106. Also, since the hole 180 is off-centered with respect to the body 144 of the blade holder 106 and the slot 140 of the sipe blade 108 is also off-centered with respect to its body, the roll pin 182 will prevent the sipe blade 108 from being inserted into the blade holder 106 from above the blade holder 106 unless the slot 140 and the roll pin 182 are in alignment. This prevents the blade 108 from being inserted in a one hundred eighty degree reverse orientation about a vertical axis. This helps to ensure that the correct blade holder, sipe blade and orientation between these components are provided when assembling the sipe blade and blade holder subassembly 104.

Of course, it is contemplated that the configuration of the blade holder 106 could be altered. For example, the dimensions of the heels 156, 162 such as their height and the distance they extend from the main body 144 of the blade holder 106 could be changed if so desired. Also, the location of the clamp surface 172 and the gap 170 that separates the heels 156, 162 could be varied so that the clamp surface 172 is not coplanar with the top surfaces 158, 164 of the heels 156, 162, which may not be coplanar with each other. Likewise, the perimeter of the main body 144 of the blade holder 106 could be circular or curved and the cross-section could be something other than rectangular such as trapezoidal or conical. In addition, the hole 180 for the roll pin 182 may not be found above the clamp surface 172 but could be located above one of the bottom surfaces 160, 166 of the heels 156, 162. The hole 180 also does not need to have a round configuration but could have a square shape. Similarly, the stop member does not have to be a roll pin 182 but could be a small cap screw. In such a case, a counterbore could be located on the front or rear surfaces 148, 150 of the blade holder 106 concentric with the hole 180. The hole 180 could be tapped so that the cap screw could be screwed into the blade holder 106 with its head being flush to recessed compared to the front or rear faces 148, 150 of the blade holder 106. Also, the top or curing surface 146 of the blade holder 106 is flat in a retread application, but could be concave to match the curing surface of a mold sector in a molding application. Accordingly, all of these variations are within the scope of the present invention.

It should be noted that the use of a stop member, hole 180 for receiving the stop member on the blade holder 106, and the slot 140 on the blade 108 are only desirable if the blade 108 is asymmetrical and it is desired to prevent the apparatus from being misassembled. In situations where the blade 108 is symmetrical, these features may be omitted. Therefore, variations lacking these features are also within the scope of the present invention. Alternatively, the shape of the sipe blade 108 in its second portion 118 could be used to prevent misassembly. In situations where two differently configured sipe blades have identical two dimensional characteristics so that they both can fit within a slit 178 of the blade holder, the hole 180 and stop member could be used to prevent improper assembly of the sipe blade and blade holder.

The blade holder 106 can be manufactured from plate stock of 1020 carbon steel in the following way. The thickness of the plate stock is ground to the proper thickness, forming the front and rear surfaces 148, 150 of the blade holder 106. The profile of the heels 156, 162, clamp surface 172, side surfaces 152, 154 and curing surface 146 of the blade holder 106 is then machined using a wire EDM process. Finally, the wire start hole is drilled into the block adjacent to the location of the finished dimension of the second heel 162 so that its central axis is parallel to the draw direction of blade 108. Then the slit 178 is machined using a wire EDM process and the portion of the block that has the wire start hole in it is cut off, forming the body of the blade holder 106 with the slit 178 extending completely through the second heel 162. This construction is particularly advantageous because it eases manufacturing the blade holder 106 and removes the wire start hole which could be a source of flash. Alternatively, the profile of the blade holder could be milled.

Figure 3:
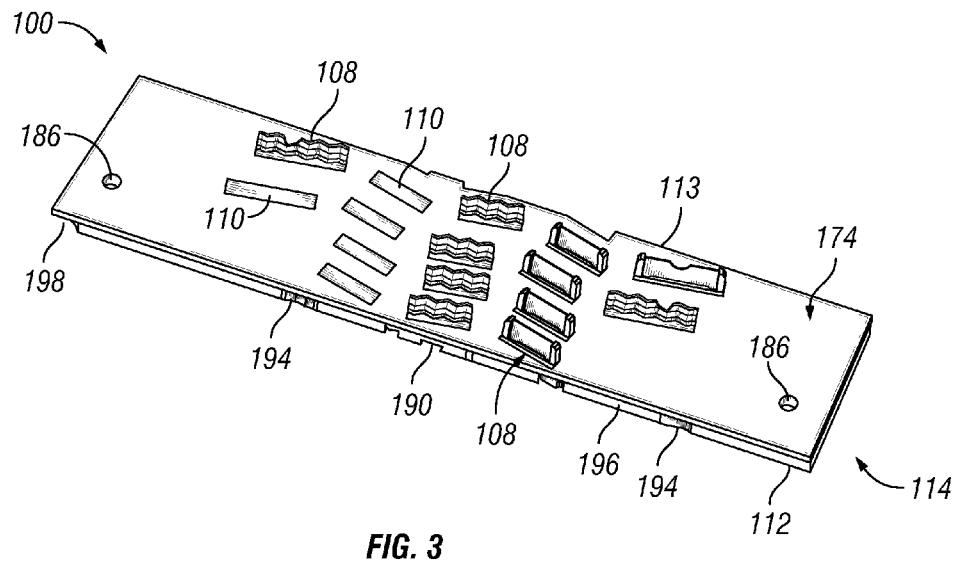
FIG. 3 is a perspective view of an apparatus according to the first embodiment of the present invention showing the use of several configurations of sipe blades and dummy inserts with only a portion of the plates shown for clarity.
Figure 4:
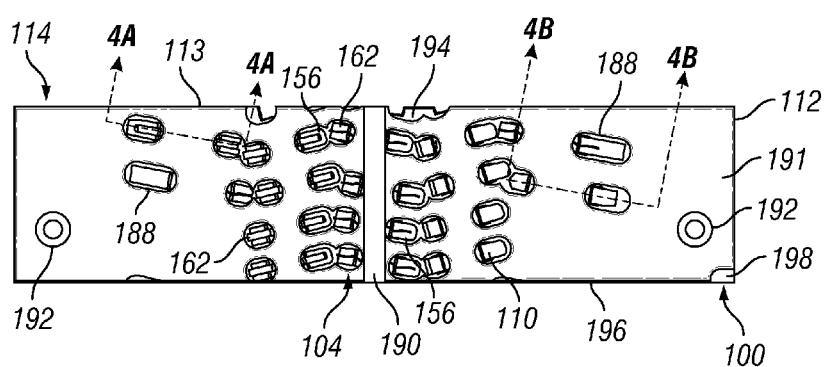
FIG. 4 is a bottom view of the of the apparatus of FIG. 3.

Looking at FIGS. 3 and 5, the dummy insert 110 can be clearly seen. Its construction in geometry and material is essentially the same as the blade holder 106 except that it lacks a slit 178 for receiving the blade 108 and a hole 180 for receiving the stop member. These features are not necessary since the dummy insert 110 does not receive a sipe blade 108 but is intended to fill one of the apertures 102 of the curing plate 100 temporarily to eliminate the presence of a sipe blade 108. Of course, this dummy insert 110 can be replaced with a blade holder and sipe blade subassembly 104 with a desired configuration at any time. This component thereby adds to the flexibility and modularity of the present invention but it is contemplated that a dummy insert 110 may not be necessary for all applications.

FIGS. 3, 4, 5 and 7 also show the construction of the curing plate 100 and retainer plate 112. As stated previously, the curing plate 100 comprises a rectangular shaped plate with a plurality of apertures 102 for receiving the blade holder and sipe blade subassemblies 104 and/or dummy inserts 110. The curing plate 100 also has at least two tapped holes 186 and two asymmetrically placed dowel pin holes (not shown). The retainer plate 112 is also a rectangular shaped plate that has the same outer dimensions as the curing plate 100, or is slightly smaller for clearance, and that also has a series of clearance holes 188. It also has a keyway 190 on its bottom surface 191, at least two screw counterbores 192, and two asymmetrically placed dowel pin holes (not shown) that are capable of aligning with the dowel pin holes of the curing plate 100. There are also some cutouts 194 in the front face 196 of the plate that allow one plate subassembly 114 with dummy inserts 110 or blade holders 106 that are closely situated to the edge of a curing plate 100 such that their heels 156, 162 extend past the plate 100 to fit within these cutouts so that there is no interference and both plate subassemblies 114 can be installed on a retread press or in a mold. The front face 196 also has a notch 198 found at its one corner and a bolt 184 that is located in linear alignment on the rear face 113 with the notch 198. Although both plates 100, 112 are flat in a retreading application, it is contemplated that they could have other configurations such as curved or concave for a molding application.

Figure 7:
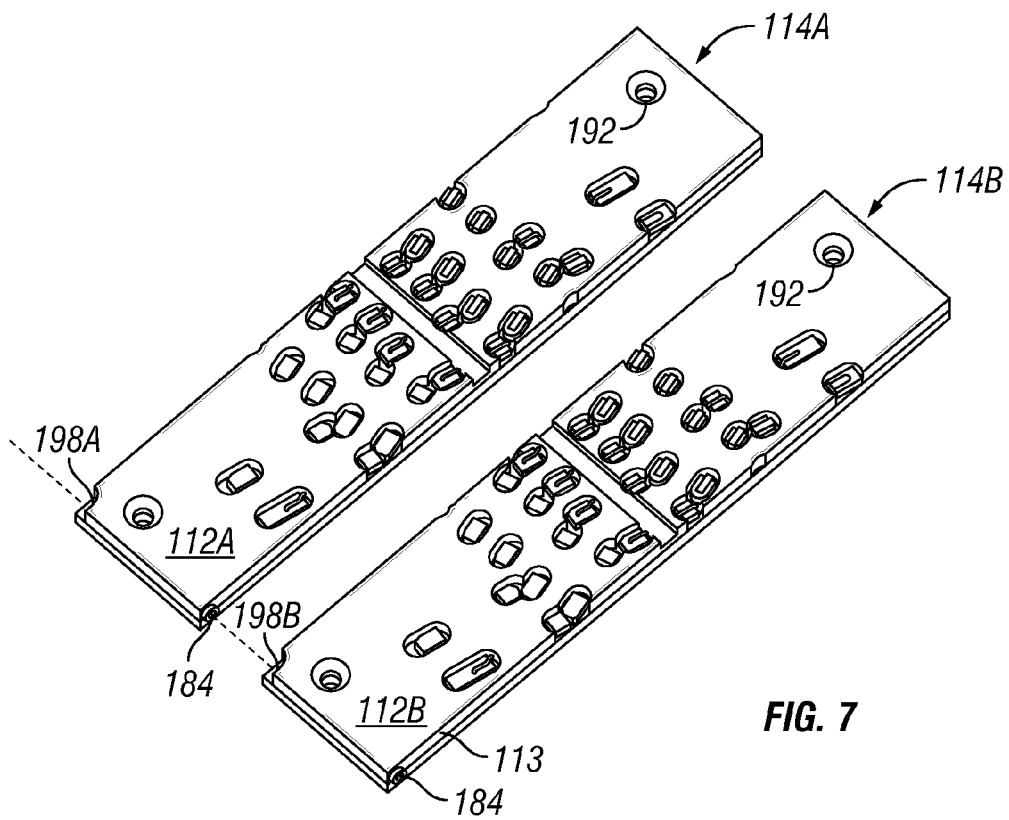
FIG. 7 is an assembly view showing the notch of the curing plate of one plate subassembly receiving the bolt of another plate subassembly as they are installed into a retread press.
Figure 8:
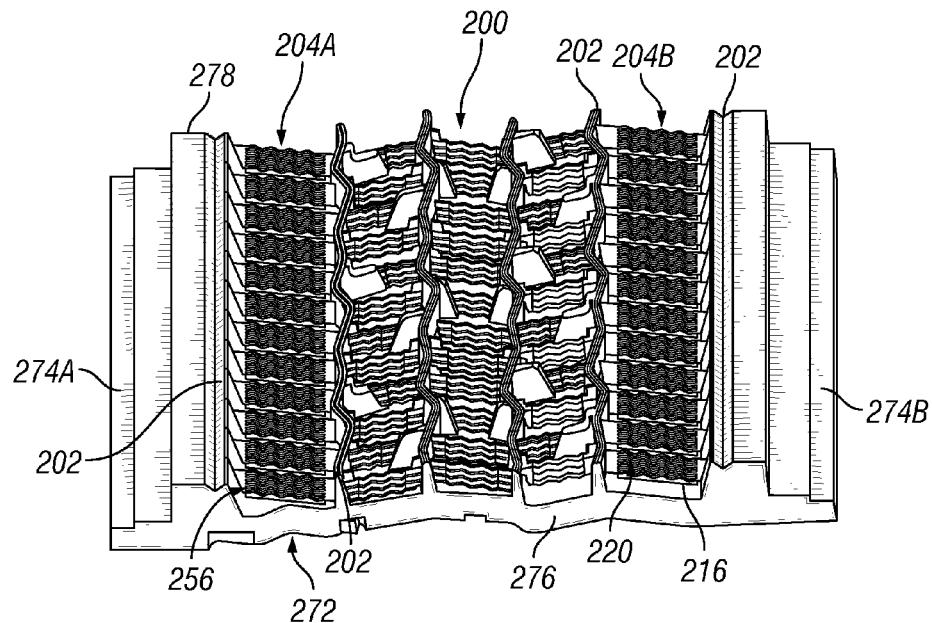
FIG. 8 is a perspective view of an apparatus according to the second embodiment of the present invention showing sipe blades in the outer rows of the curing plate that have three dimensional configurations in their middle portions that transition to two dimensional configurations on their sides that blend into projections found on the curing plate.

Looking now at FIGS. 5-7, the method of assembling the first embodiment is clearly depicted. First, the roll pin 182 is inserted into the hole 180 of blade holder 106 such that it passes through the slit 178. Since the roll pin 182 is slightly larger than the size of the hole 180, the pin 182 needs to be slightly compressed, which is easily done due to its split construction, so it can be installed into the hole 180. Once in the hole 180, the pin 182 expands producing friction that keeps the roll pin 182 in the hole 180 unless it is pressed back out of the hole 180 purposely. Second, the sipe blade 108 is inserted from above the blade holder 106 with its slot 140 in linear alignment with the roll pin 182 until the sipe blade 108 enters the slit 178 of the blade holder 106. This movement continues until the closed end 142 of the slot 140 of the sipe blade 108 bottoms out onto the roll pin 182. This is usually done with the sipe blade 108 facing upward in a vertical direction so that gravity holds the blade 108 in the blade holder 106, retaining the blade 108 and blade holder 106 as a subassembly 104. Next, this subassembly 104 is inserted into the appropriate aperture 102 of the curing plate 100 with the first heel 156 of the blade holder 106 pointing in a desired direction. This step is repeated until all the apertures 102 of the curing plate 100 are filled with a sipe blade/blade holder subassembly 104 or dummy insert 110. Note that it is possible for the assembler to insert the first row of subassemblies with the first heel pointing in the wrong direction which is revealed when assembling the retaining plate as will be discussed in more detail later.

Once a first set of blade holder/sipe blade subassemblies 104 and dummy inserts 110 have been installed in a row with their first heel 156 pointing in a particular direction, all holder/sipe blade subassemblies 104 and dummy inserts 110 in an adjacent row must have their second heel 162 pointed toward the first heel 156 of the adjacent blade holder/sipe blade subassembly 104 or dummy insert 110 or their heels will interfere preventing the second blade holder/sipe blade subassembly 104 or dummy insert 110 from being installed.

In other words, one aperture 102 of the first row of the curing plate 100 is sufficiently close to the second aperture 102 of the second row of the curing plate 100 or mold sector so that two adjacent blade holders 106 or dummy inserts 110 cannot be placed within these apertures 102 with their first heels 156 being closest to the adjacent aperture 102. This is true because the first heels 156 extend further from the body 144 of the blade holder 106 or dummy insert 110 than the second heel 162 and will interfere with each other if they are placed next to each other. Thus, the assembler is forced to reverse the orientation of the second blade holder 106. After being installed into the curing plate 100 or mold sector, the heels of the blade holders 106, sipe blades 108 and dummy inserts 110 prevent their respective components from passing through the curing plate 100 or mold sector. Then the curing plate 100 or mold sector, blade holders 106, sipe blades 108, and dummy inserts 110 are inverted so that their heels are exposed.

The retainer plate 112 is then placed over the curing plate 100 with its keyway 190 facing upward so that the dowel pins (not shown) that are found within the dowel pin holes of the retainer plate 112 align with dowel pin holes of the curing plate 100. At the same time, the clearance holes 188 of the retainer plate 112 align with the heels of the components inserted into the curing plate 100 and clear them allowing the retainer plate 112 to be screwed onto the curing plate 100. The chamfers 168 found on the heels 156, 162 of the blade holders 106 or dummy inserts 110 help ensure this clearance. The retainer plate 112 now presses onto the clamp surfaces 138, 172 of the components preventing them from falling out of the curing plate 100. The retainer plate 112 is then screwed onto the curing plate 100.

At this point, it is possible that retainer plate 112 cannot be screwed onto the curing plate 100 or mold sector because the clearance holes 188 do not clear the heels of the components already installed into the curing plate 100 or mold sector because they were installed incorrectly. This happens when the initial blade holder/sipe blade subassemblies 104 or dummy inserts 110 were installed in the wrong orientation which then repeated itself with the subsequently installed subassemblies 104 or dummy inserts 110. In such a case, it is necessary to reinstall all the blade holder/sipe blade subassemblies 104 or dummy inserts 110 by reversing their orientation by one hundred eighty degrees about a vertical axis. The retainer plate 112 can then be mounted as described above. This potential problem is prevented when every sipe blade and blade holder subassembly or dummy insert is designed asymmetrically and can fit into an aperture of the curing plate or mold sector in only one orientation as will be described later regarding the second embodiment of the invention.

The last step is then to install the plate subassembly 114 with the sipe blades 108, blade holders 106, and dummy inserts 110 into a retread press or mold. This is accomplished by sliding the plate subassembly 114 onto a key (not shown) within the guide rails (not shown) found on the retread press or mold and sliding it until it bottoms out on the rear of the retread press or is positioned properly within a mold. Then another plate subassembly 114 is installed into the retread press or mold in like manner so that its notch 198 will receive the bolt of the adjacent subassembly 114 (see FIG. 7). This prevents the plate subassembly 114 from being inadvertently reversed in a one hundred eighty degree orientation about a vertical axis. This step is repeated until all of the plate subassemblies 114 have been loaded into the press or mold and locked into the place. The press or mold is now ready to emboss the desired geometry on a tread stock.

In some tire applications, a sipe that has three dimensional characteristics in its midportion has two dimensional characteristics on either side of the midportion that blends into a recess or groove on a tread stock. A sipe blade that forms such a geometry would therefore need to have a three dimensional configuration in its midportion 201 and a two dimensional configuration on either side of the midportion 201 that blends into raised projections 202 that are found on the curing plate 200 or mold sector. Inviting your attention to FIGS. 8 thru 14, the second embodiment, which addresses this situation, is shown in the outer rows 204 of the curing plate 200. Its construction in geometry and material is essentially the same as that of the first embodiment and can be used with a flat curing plate in a retread press or can be curved with a concaved curing surface in a molding application. However, its construction differs from the first embodiment in the following ways.

Figure 9:
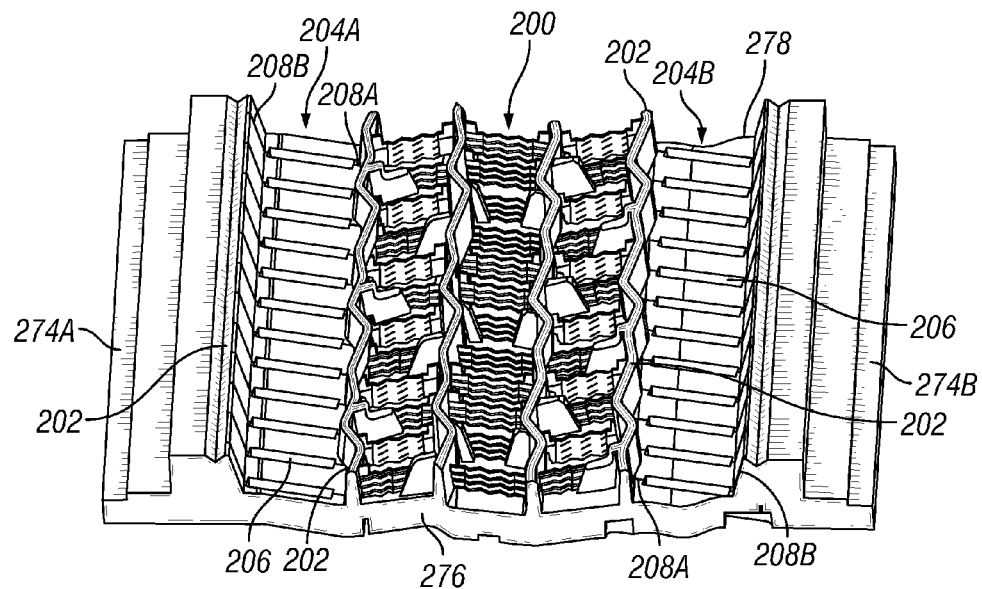
FIG. 9 is a perspective view of the apparatus of FIG. 8 with the sipe blades and blade holders of the outer rows of the curing plate removed showing the apertures and slits of the curing plate.
Figure 10:
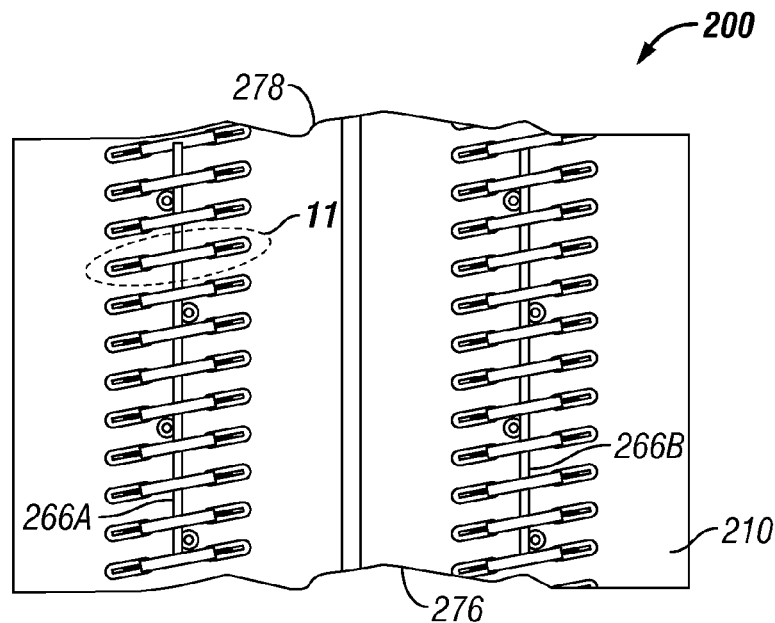
FIG. 10 is a bottom view of the apparatus of FIG. 9.
Figure 11:
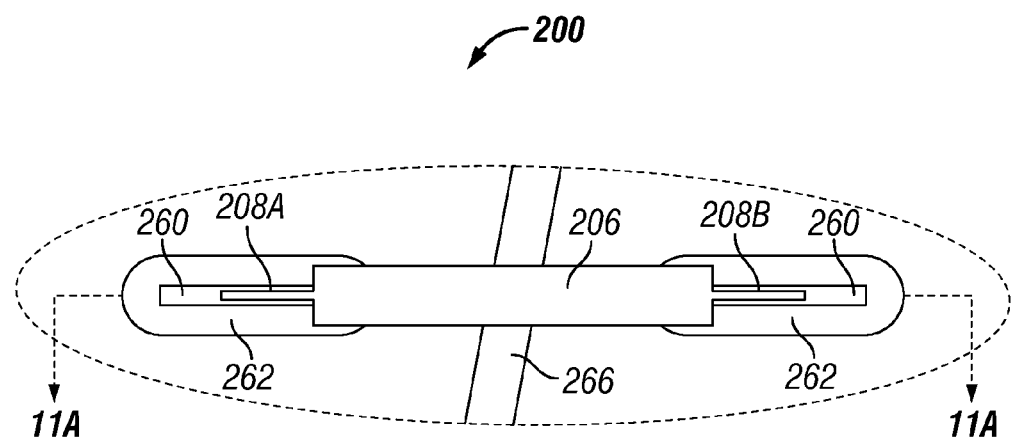
FIG. 11 is an enlarged view of the apparatus of FIG. 10.
Figure 11A:
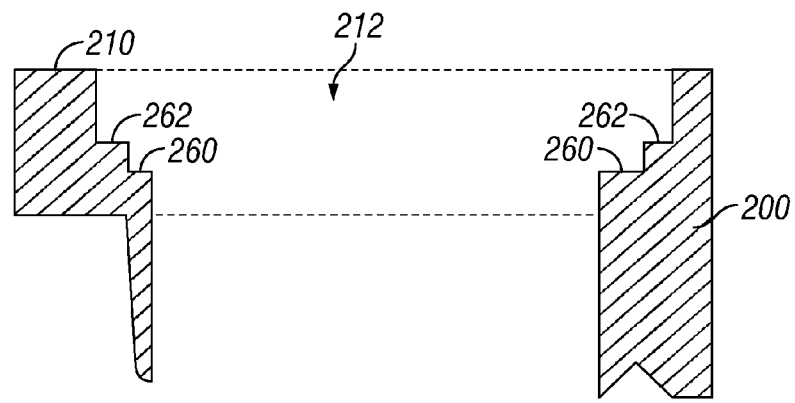
FIG. 11A is a cross-sectional view of the apparatus of FIG. 11 taken along line 11A-11A thereof showing the stepped pocket of the curing plate.
Figure 12:
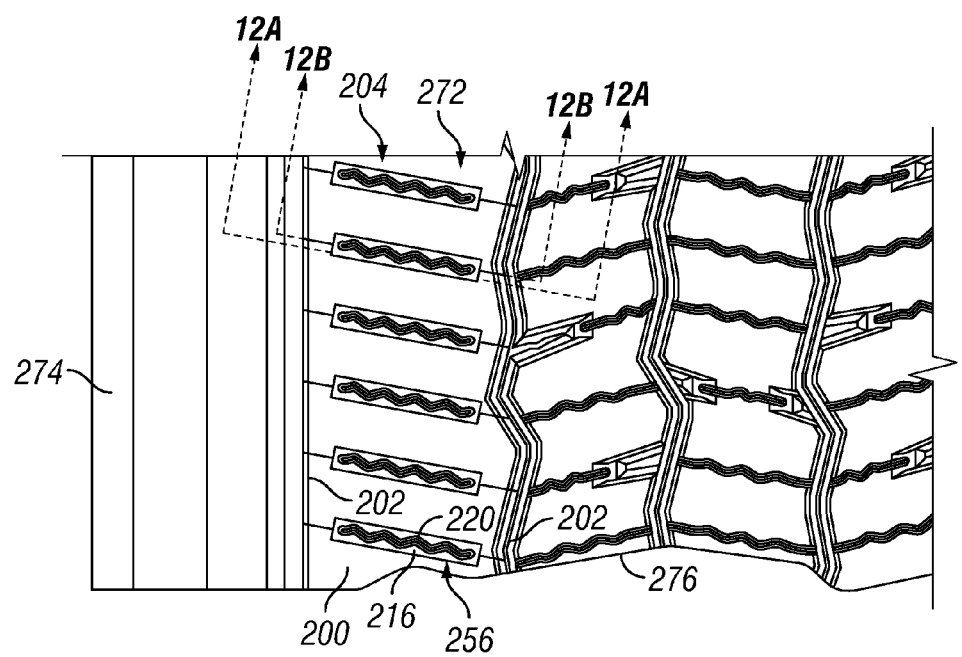
FIG. 12 is a partial top view of the apparatus of FIG. 8.
Figure 12A:
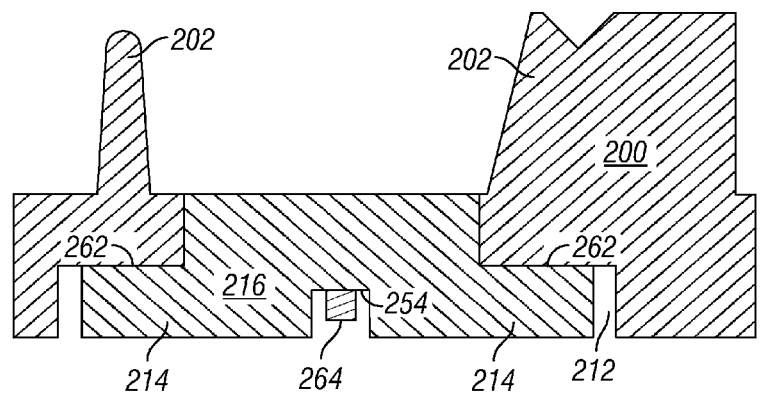
FIG. 12A is a cross-sectional view of the apparatus of FIG. 12 taken along line 12A-12A thereof.
Figure 12B:
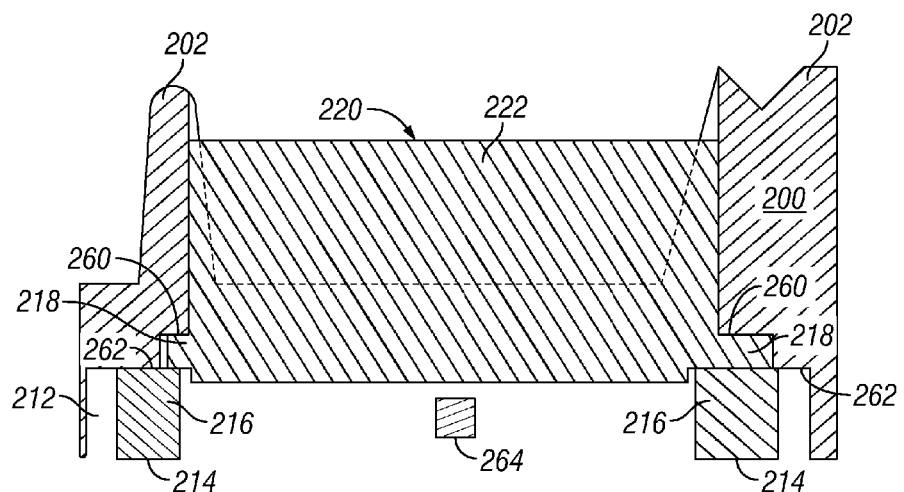
FIG. 12B is a cross-sectional view of the apparatus of FIG. 12 taken along line 12B-12B thereof.
Figure 13:
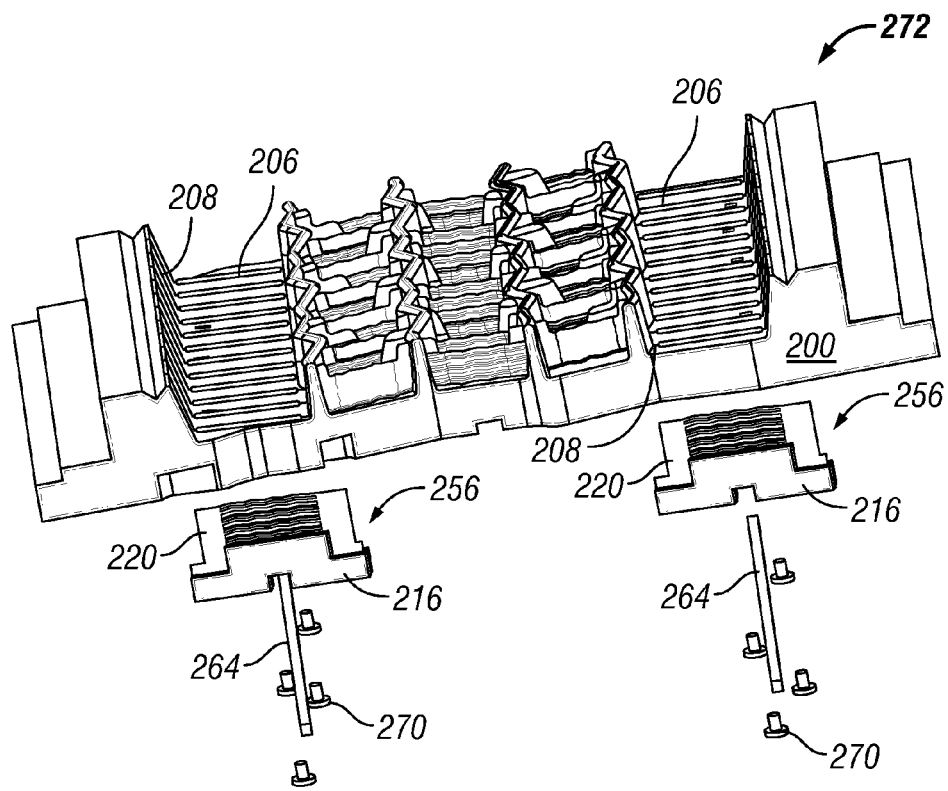
FIG. 13 is an exploded assembly view of the apparatus of FIG. 8 showing the sipe blade/blade holder subassemblies being inserted into the curing plate followed by the retaining elements and cap screws.
Figure 14:
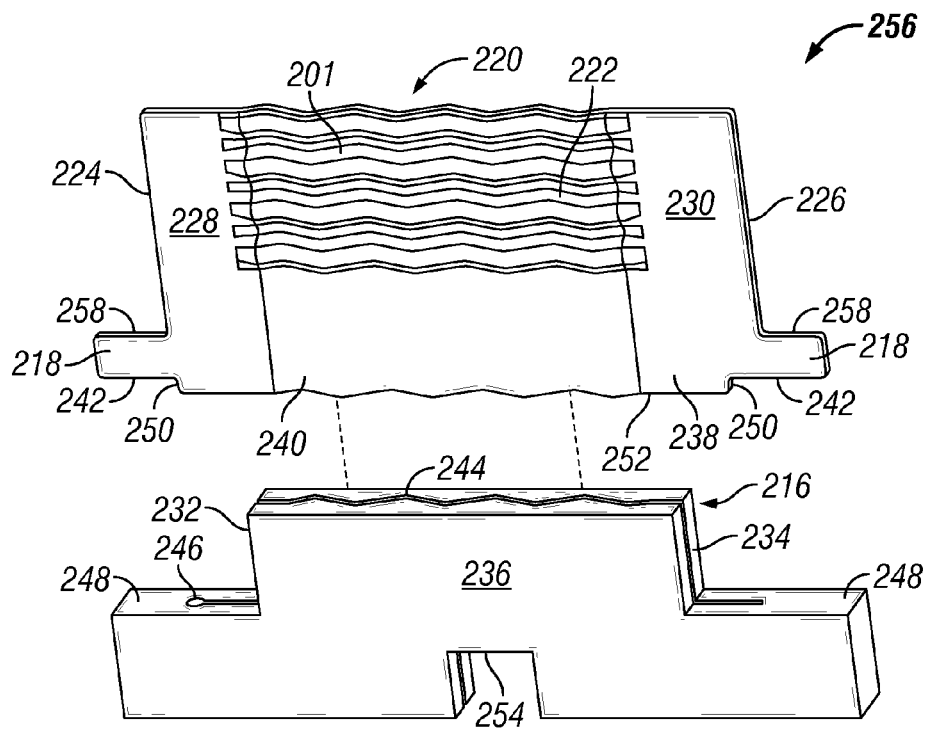
FIG. 14 is an exploded assembly view of the sipe blade/blade holder subassembly of the apparatus of FIG. 8.

First as shown by FIGS. 9 and 13, the aperture 206 in the curing plate 200 or mold sector is not simply rectangular but has two slits, a short slit 208a and a long slit 208b that extend from its sides in a direction that is parallel to the long dimension of the aperture 206. The slits 208 are located along the midplane of the aperture 206 and extend into the raised projections 202 found on the curing plate 200 or mold sector on each side of the aperture 206. It is also contemplated that the slit could be located in other places than the midplane of the aperture and that it does not have to be parallel to the long dimension of the aperture. The bottom surface 210 of the curing plate 200 or mold sector has a stepped cavity 212 that is machined by milling and is configured to receive the heels 214 of the blade holder 216 at one level and the heels 218 of the blade 220 at another level (see FIGS. 11A, 12A and 12B). Second, the sipe blade 220 does not have a three dimensional configuration along the entire width of its first portion 222 but only in the middle 201 of the first portion 222. The blade has two dimensional characteristics on either side of the middle portion 201 that extend all the way to the first and second side surfaces 224, 226. Also as shown by FIG. 14, the length of the first two dimensional portion 228 or the distance it extends from the three dimensional portion 201 is less than the length of the second two dimensional portion 230 or the distance it extends from the three dimensional portion 201. Third, the first side surface 224 of the sipe blade 220 extends past the first side surface 232 of the blade holder 216 and the second side surface 226 of the sipe blade 220 extends past the second side surface 234 of the blade holder 216 while the main body 236 of the blade holder 216 is wider than the width of the three dimensional part 201 of the first portion 222 of the sipe blade 220 such that the entire three dimensional portion 201 of the sipe blade 220 is above the main body 236 of the blade holder 216. Furthermore, the sipe blade 220 lacks a clamp surface but instead has a short tab 238 that extends off the bottom of the second portion 240 of the sipe blade 220 next to the bottom surfaces 242 of the heels 218 of the sipe blade 220.

Fool proofing characteristics found in the first embodiment such as the stop member, hole 180 for receiving the stop member on the blade holder 106, and the slot 140 on the sipe blade 108 are omitted since the blade is asymmetrical and the second two dimensional portion 230 cannot fit into the shorter slit 208a in the curing plate 200 or mold sector because of the distance the second two dimensional portion 230 extends from the second side surface 234 of the blade holder 216, which cannot be varied as the position of the blade 220 is fixed laterally with respect to the blade holder 216 as will be described later. This means it can be inserted into the curing plate 200 or mold sector only one way. In addition, the blade holder 216 is symmetrical with the first and second heels 214 extending the same distance from the main body 236 since the blade holder 216 is no longer relied upon to foolproof the assembly of the sipe blade 220 into the curing plate 200 or mold sector, although it is contemplated that differentiating the length and/or height of the heels could be used to fool proof assembly if desired. Also as shown by FIG. 13, the slit 244 does not extend completely through either heel and a wire start hole 246 is present in the first heel at the beginning of the slit 244 allowing the blade holder 216 to be made by a wire EDM process in a conventional manner. This is possible since the wire start hole 246 is not located near the curing surfaces of the apparatus. When the sipe blade 220 is inserted into the slit 244 of the blade holder 216, the blade 220 slides down until the bottom surfaces 242 of the heels 218 of the blade 220 rests on the top surfaces 248 of the heels 214 of the blade holder 216 and the tab 238 is found below these top surfaces 248 and is partially contained within the heels 214 of the blade holder 216. There is clearance between the side surfaces 250 of the tab 238 and the sides of the slit 244 of the blade holder 216 as the undulations of the second portion 240 of the blade 220 locate the blade 220 laterally within the slit 244 of the blade holder 216 (see FIG. 14). It should be noted that the bottom surface 252 of the tab 238 is above the clamping surface 254 of the blade holder 216 since the blade holder 216 presses against the blade 220 to hold it into position (see FIG. 12B).

Once a blade holder/sipe blade subassembly 256 according to the second embodiment has been assembled, it is inserted into a curing plate 200 or mold sector such that the top surfaces 258 of the heels 218 of the blade 220 rest upon the top surface 260 of the stepped pocket 212 while the top surfaces 248 of the heels 214 of the blade holder 216 rest upon the intermediate surface 262 of the stepped pocket 212 which prevents the sipe blade 220 and blade holder 216 from passing through the curing plate 200 or mold sector. At this time, instead of just having the blade holder 220 fill the aperture 206 of the curing plate 200 or mold sector as with the first embodiment, the extremities of the sipe blade 220 fill up the slits 208 on either side of the aperture 206 and fill any void created by the slits 208 in the projections 202 of the curing plate 200 or mold sector. Thus, the sipe blade provides a three dimensional configuration with undercuts where desired and then transitions into a two dimensional configuration without undercuts that then blends into a projection. Next, a long retaining element 264 is placed into a slot 266 that is milled onto the bottom 210 of the curing plate 200 or mold sector and placed therein, pressing onto the clamp surfaces 254 of the blade holder(s) 216. The retaining element 264, blade holders 216 and blades 220 are held onto the curing plate 200 or mold sector using cap screws 270. This plate subassembly 272 is then loaded into a retread press or mold using the ears 274 found on each side of the curing plate 200 in like manner as described above for the first embodiment except that no notches or bolts are used to prevent misassembling the apparatus since the front surface 276 of the curing plate 200 is contoured so that the next plate subassembly 272 must have a rear face 278 with a complimentary shape or the subassemblies will not mate properly, alerting the assembler that something is awry.

Figure 15:
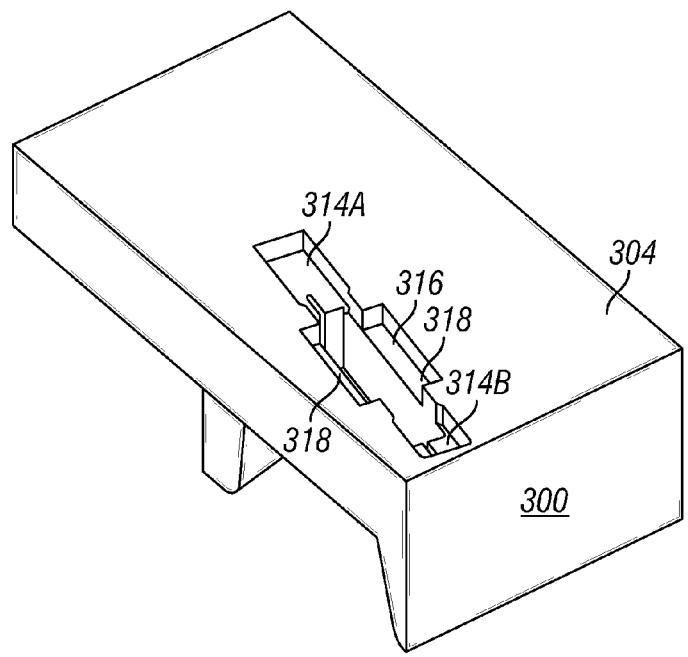
FIG. 15 is a bottom oriented perspective view of an apparatus according to the third embodiment of the present invention with the blade holder, sipe blade and retainer plate removed showing the heel pockets of the curing plate more clearly.
Figure 16:
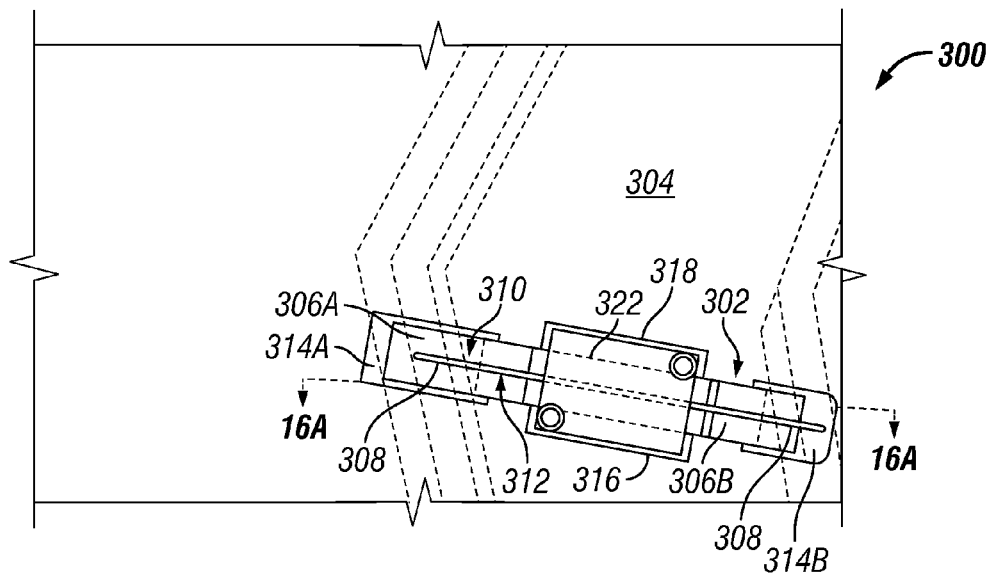
FIG. 16 is a bottom view of the apparatus of FIG. 15 with the blade holder, sipe blade and retainer plate shown.
Figure 16A:
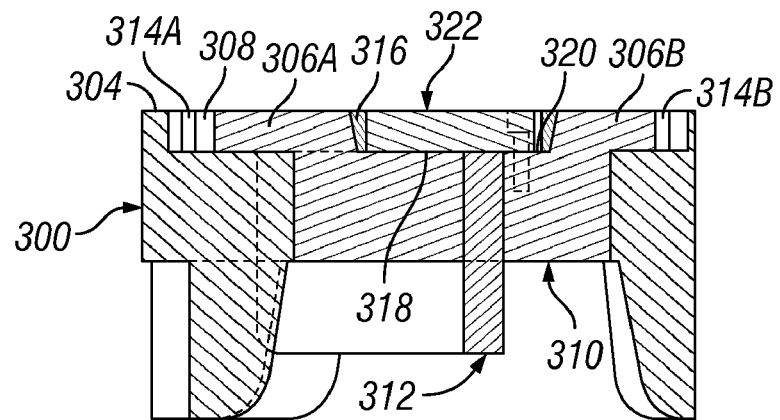
FIG. 16A is a cross-sectional view of the apparatus of FIG. 16 taken along line 16A-16A thereof.
Figure 17:
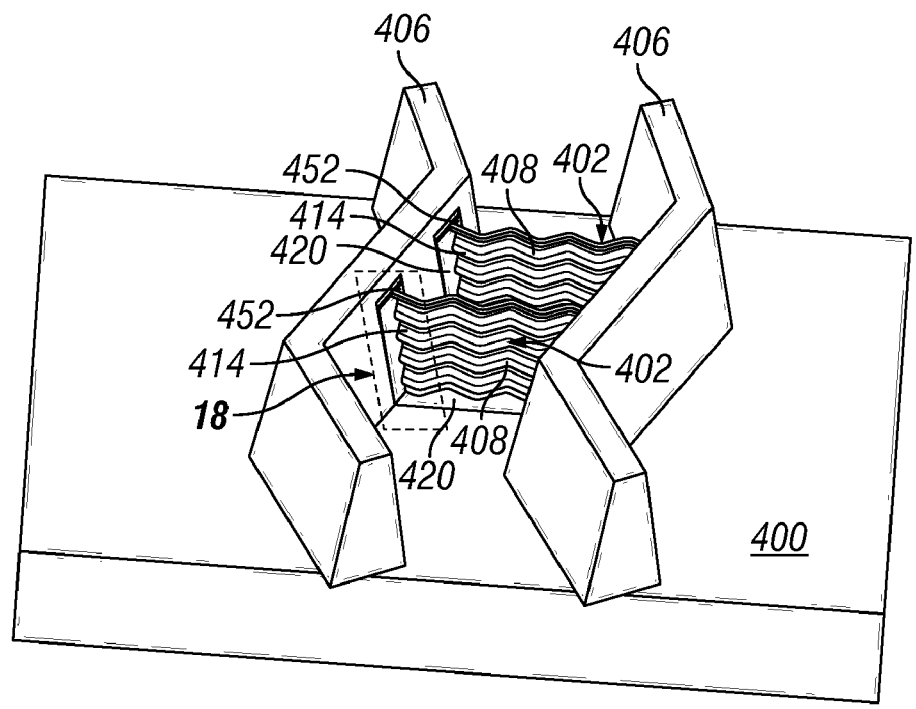
FIG. 17 is a perspective view of an apparatus according to the fourth embodiment of the present invention that shows a sipe blade with blade holders that enable the sipe blade to blend into projections found on the curing plate.
Figure 18:
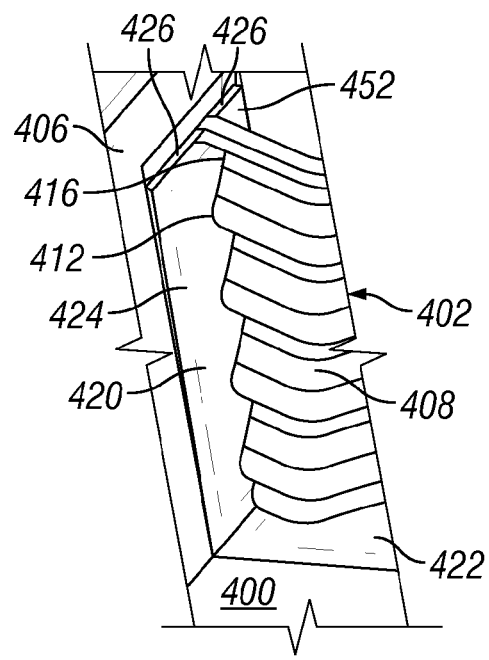
FIG. 18 is an enlarged view of the apparatus of FIG. 17.
Figure 19:
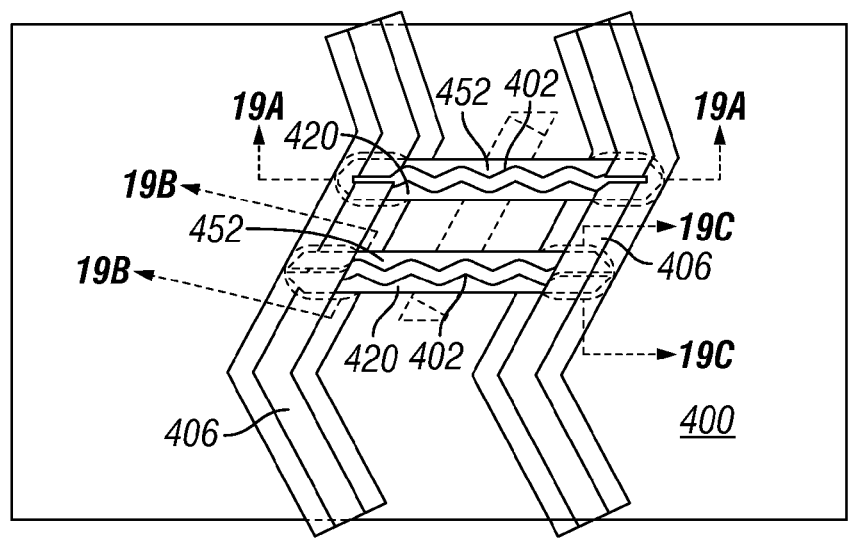
FIG. 19 is a top view of the apparatus of FIG. 17.
Figure 19A:
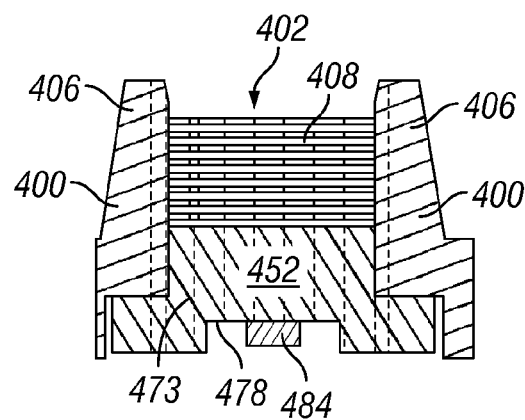
FIG. 19A is a cross-sectional view of the apparatus of FIG. 19 taken along line 19A-19A thereof.
Figure 19B:
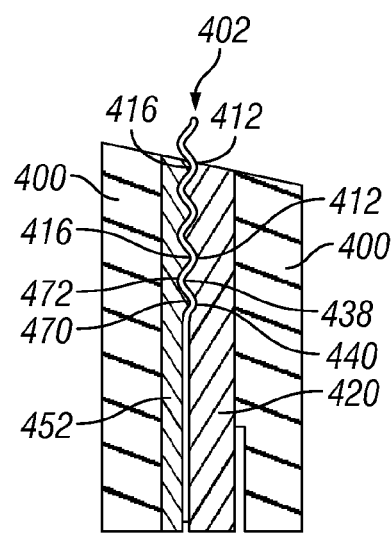
FIG. 19B is a cross-sectional view of the apparatus of FIG. 19 taken along line 19B-19B thereof.
Figure 19C:
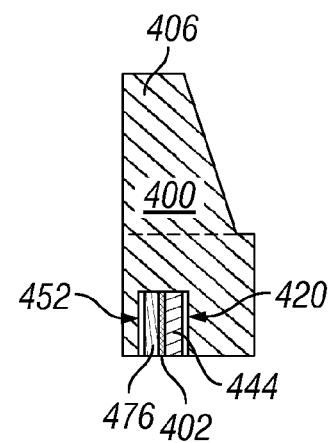
FIG. 19C is a cross-sectional view of the apparatus of FIG. 19 taken along line 19C-19C thereof.

In other applications, there may be few blade holder/sipe blade subassemblies that are inserted into the curing plate or mold sector. This may make it unnecessary and undesirable due to cost to create a larger retainer plate 112 or long retaining element 215. In other situations, the relative positions of the blade holder/sipe blade subassemblies may not be compatible with a single long retaining element. FIGS. 15 thru 17 show a third embodiment of the present invention which addresses these situations. In this embodiment, the construction of the blade holder/sipe blade subassembly 302 is similar to either of the first two embodiments described herein. However, the curing plate 300 or mold sector is thicker like the second embodiment so that its bottom surface 304 extends to the bottom surfaces of the heels 306, 308 of the blade holder 310 and sipe blade 312. The bottom surface 304 of the curing plate 300 or mold sector defines two heel pockets 314 that receive the heels 306 of the blade holder 310, sipe blade 312 or dummy insert (not shown). The heel pockets 314 are configured so that the first heel 306a of the blade holder 310 or dummy insert cannot fit within the smaller pocket 314b, helping to ensure that the blade holder/sipe blade subassembly 302 will be inserted into the curing plate 300 or mold sector in only one orientation. It also defines a cavity 316 that has a top surface 318 that is adjacent to and coplanar with as many of the clamping surfaces 320 of the blade holder 310, sipe blade 312, or dummy insert as possible. A retainer member 322 in the form of a small rectangular shaped plate fits within this cavity 316 and between the heels of these components, which are seated in the curing plate 300 or mold sector, and presses onto the clamp surfaces 320 of these components. The retainer member 322 is then screwed to the curing plate 300 or mold sector, preventing the components from falling out of the curing plate 300 or mold sector.

It is contemplated that fool proofing the assembly for this embodiment could be achieved by carefully choosing the size, shape and placement of the retainer member 322 in conjunction with the size and position of the cavity 316 and clamp surfaces of the blade holder 310 and sipe blade 312.

Figure 20:
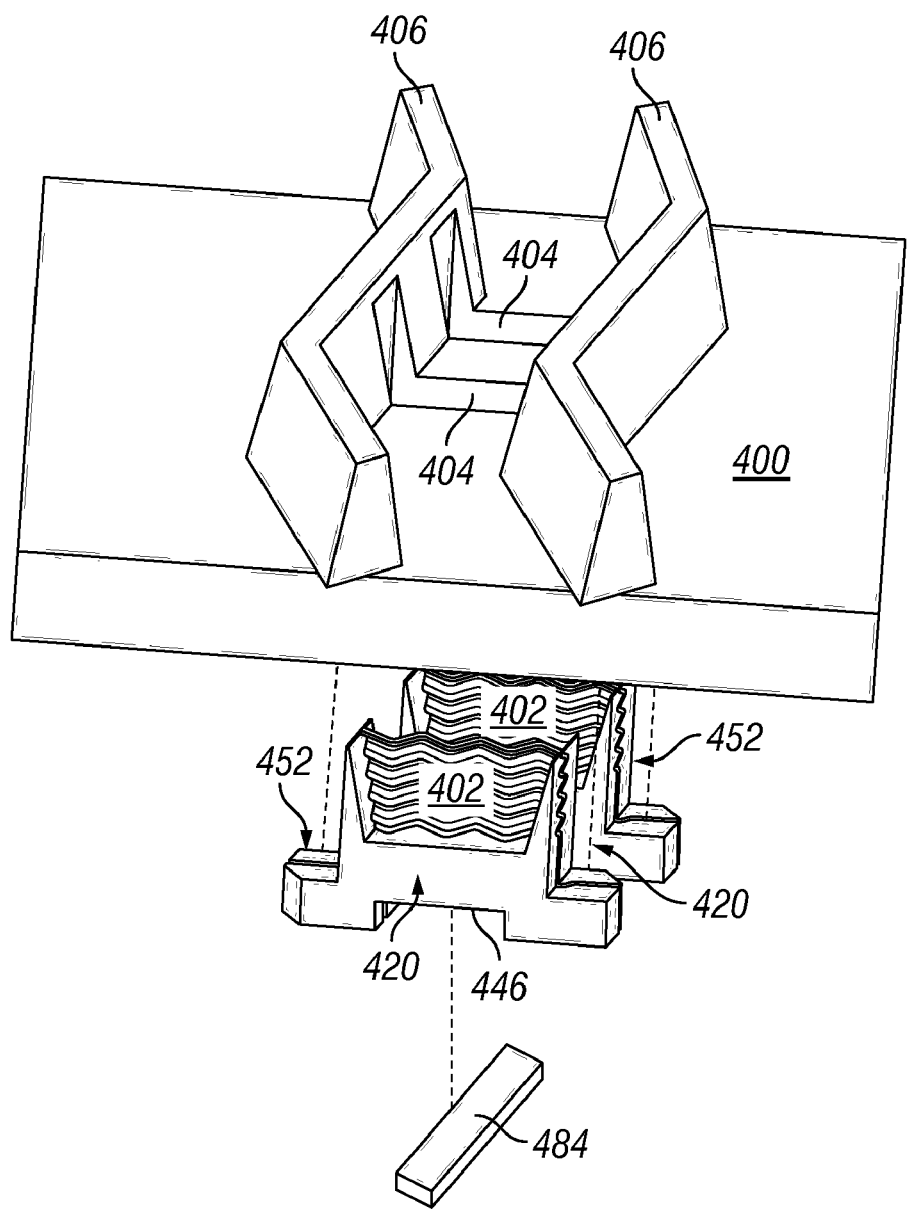
FIG. 20 is an exploded assembly view of the apparatus of FIG. 17.
Figure 21:
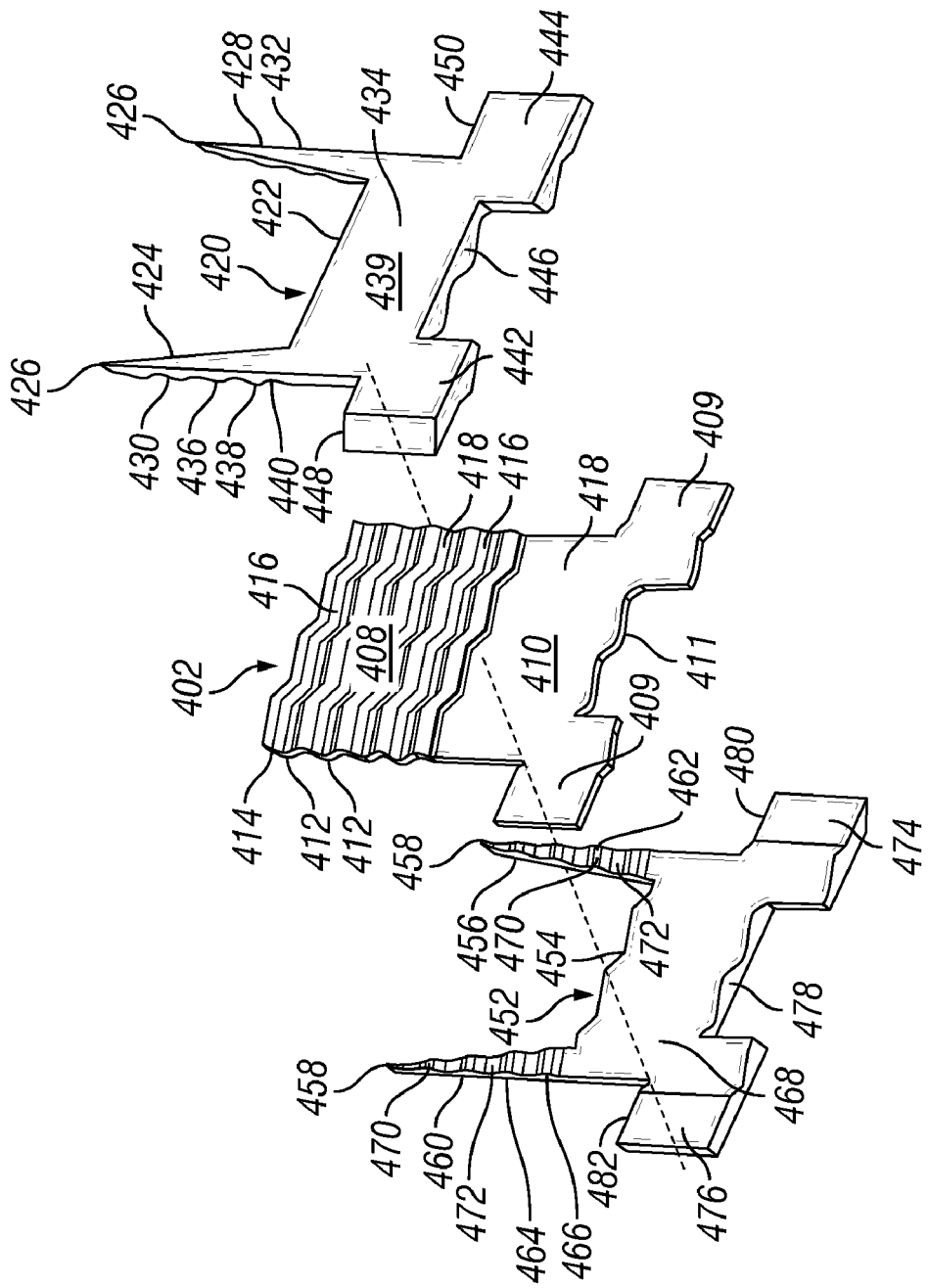
FIG. 21 is an exploded assembly view of the sipe blade and blade holders of the apparatus of FIG. 17.

Yet another application for which there has not been a suitable solution is when a three dimensional sipe blends into a recess or groove of a tire tread. The fourth embodiment depicted by FIGS. 17 thru 21 presents a suitable way of providing means for replacing a three dimensional sipe blade 402 with an undercut in its first portion 408 that can be inserted into a curing plate 400 or mold sector that has an aperture 404 that extends into a pair of projections 406, allowing the sipe blade 402 to effectively blend into the projections 406. It comprises, in part as best shown in FIG. 21, a sipe blade 402 that has essentially the same configuration as the sipe blade 108 of the first embodiment including heels 409 and a clamp surface 411 except that a slot 140 is omitted since the blade 402 is symmetrical and fool proofing for assembly is not necessary. Instead, the heel height of the sipe blade 402 could be used for fool proofing to make sure that one blade of symmetrical construction is not inadvertently substituted for another blade of symmetrical construction. Furthermore, the second portion 410 of the blade 402 is not necessarily used to retain the blade 402 within the apparatus but could be simply contained within the apparatus for reasons that will be explained later. As can be seen, the first portion 408 has geometry that varies both in a plane that is parallel to the direction of draw and in a plane that is perpendicular to the direction of draw. The variations exist across the entire width of the first portion 408 of the sipe blade 402. These variations comprise a series of undercuts that have a male portion 412 on the front surface 414 of the sipe blade 402 and a female portion 416 directly opposite of the male portion 412 on the rear surface 418 of the sipe blade 402. These undercuts are wavy so that the male and female portions 412, 416 alternate on both the front and rear surfaces 414, 418. It is contemplated that this embodiment can be altered to accommodate other configurations of sipe blades that are not wavy, such as tear drop shaped blades or blades having rectangular shaped cross-sections or other shapes with abrupt angles.

Again as best shown in FIG. 21, this embodiment also includes a first blade holder 420 that has a body with a bottom curing surface 422 and a first spire 424 that rises from the bottom curing surface 422 to a top curing surface 426 and a second spire 428 that rises from the bottom curing surface 422 to a top curing surface 426. These surfaces are called curing surfaces because once installed in a retread press or mold, the bottom curing surface forms the top surface of the tread and conducts heat to it for curing while the top curing surface forms a part of the bottom of a groove or other depression found on the tread and conducts heat there for curing. Both spires 424, 428 are located at the extremities of the top portion of the first blade holder 420 and form a portion of the first side surface 430 and second side surface 432 of the first blade holder 420. The front surface 434 of the blade holder 420 is configured to mate with the interior surface of the aperture 404 of the curing plate 400 while the rear surface 436 has alternating male and female portions 438, 440 along the spires 424, 428 that mate with male and female portions 412, 416 of the sipe blade 402. The first blade holder 420 also has a bottom portion 439 for retaining the blade holder 420 in the apparatus that has a first heel and a second heel 442, 444 that are separated by a gap that defines the clamp surface 446 that is coplanar with the top surfaces 448, 450 of the heels 442, 444. This bottom portion 439 is also wavy in a plane that is perpendicular to the direction of draw so that it can mate properly with the second portion 410 of the sipe blade 402.

A second blade holder 452 is also provided that has a body with a bottom curing surface 454 and a first spire 456 that rises from the bottom curing surface 454 to a top curing surface 458 and a second spire 460 that rises from the bottom curing surface 454 to a top curing surface 458. Both spires 456, 460 are located at the extremities of the top portion of the second blade holder 452 and form a portion of the first side surface 462 and second side surface 464 of the second blade holder 452. The front surface 466 of the second blade holder 452 is configured to mate with the interior surface of the aperture 404 of the curing plate 400 while the rear surface 468 has alternating male and female portions 470, 472 along the spires 456, 460 that mate with male and female portions 412, 416 of the sipe blade 402. The second blade holder 452 also has a bottom portion 473 for retaining the blade holder 452 in the apparatus that has a first heel 474 and a second heel 476 that are separated by a gap that defines the clamp surface 478 that is coplanar with the top surfaces 480, 482 of the heels 474, 476. This bottom portion 473 is also wavy so that it will match with the second portion 410 of the sipe blade 402. The second blade holder 452 may have an identical configuration to that of the first blade holder 420.

This embodiment of the invention is assembled as follows. First, the first blade holder 420 is pressed with its rear surface 436 contacting the rear surface 418 of the sipe blade 402 such that the male and female portions 438, 440 of its spires 424, 428 mate with the complimentary shaped male and female portions 412, 416 of the sipe blade 402. Second, the second blade holder 452 is pressed with its rear surface 468 contacting the front surface 414 of the sipe blade 402 such that the male and female portions 470, 472 of its spires 456, 460 mate with the complimentary shaped male and female portions 412, 416 of the sipe blade 402 with the spires found next to each other on either side of the sipe blade. The mating of these components creates a blending of the sipe blade 402 into the blade holders 420, 452 that is free of gaps that could allow rubber to flash into them. Also, the sipe blade 402 cannot move in the draw and anti-draw directions with respect to the blade holders 420, 452 as all three components are interlocked. This could be used as the sole means for retaining the sipe blade in the apparatus. At the same time, the bottom portions 439, 473 of the blade holders 420, 452 also mate closely with the second portion 410 of the sipe blade 402 so that no rubber can flash down in between the components. Next as shown by FIG. 20, all three components are inserted into the aperture 404 of the curing plate 400 or mold sector, filling the gaps found in the projections 406 of the curing plate 400 or mold sector created by the aperture 406, allowing the sipe blade 402 to effectively blend into these projections 406 (see FIGS. 17 and 18). At this point, the curing plate 400 or mold sector holds the blade holders 420, 452 and sipe blade 402 together. Finally, a retainer plate 484 is used to hold these components in the curing plate 400 or mold sector as previously described for the other embodiments.

Of course, it is contemplated that the blade holders and sipe blade used in this embodiment of the invention could have different configurations. The sipe blade could have a different configuration than the wavy shape shown and could lack heels. In like fashion, the blade holders could have different numbers and shapes of spires. For example, the blade holders could have a single spire that is situated in their middle portion and this spire could be much wider than shown in the drawings contained herein. Also, the top and bottom curing surfaces could be angled, flat or could be something other than planar. Finally, the sipe blade and blade holders could be held in the apparatus by other means than heels known in the art such as being screwed in place or if heels are used, they could be changed so that the heels of the blade holders and sipe blade are not coextensive. Also, no fool proofing is provided in this example of the fourth embodiment but fool proofing techniques described above could be used if applicable. In addition, the blade and holders may be curved instead of straight. Therefore, these other variations are also considered to be within the scope of the present invention.

The sipe blades 408 can be manufactured as previously described for other embodiments while the blade holders 420, 452 can have the profile made using a wire EDM process with the wavy areas burnt thereon using an electrode via an EDM process. Alternatively, the wavy areas could be milled onto the blade holders 420, 452.

All of the features of the embodiments described above may be used alone or in combination to provide an apparatus that it can be used to mold or retread tires with sipe blades that have different configurations including two or three dimensional. They also provide a way to assemble and disassemble such an apparatus including the following steps. The first step would be to provide a curing member such as a plate or mold sector that has a curing surface and a bottom surface and an aperture that extends through both surfaces, a blade holder that has a curing or top surface and a slit, and a sipe blade that has a first portion for forming or molding a sipe in a tread stock of a tire and a second portion that fits within the slit of the blade holder. Another step is to insert the sipe blade into the blade holder through the curing surface of the blade holder so that the second portion is located within the slit of the blade holder. This is particularly advantageous as this allows the blade holder to hold either two or three dimensional sipe blades as three dimensional sipe blades cannot be inserted through the bottom of a blade holder as this would require the slit to be too large, leaving a gap between the blade holder and sipe blade that would be susceptible to flash when the sipe blade and blade holder are assembled. Yet another step is to insert the blade holder and sipe blade through the bottom surface of the curing member into its aperture until the sipe blade and blade holder are seated within the curing member.

The sipe blade and blade holder are then retained in the curing member. The apparatus may be disassembled by reversing the above steps.

Retaining the sipe blade and blade holder in the curing member may be accomplished by providing a retainer member such as a plate that contacts the blade holder and holds it within the curing member. The retainer member may be held onto the curing member using a fastener such as a cap screw. In addition, the retainer member may also contact the sipe blade and hold it within the curing member. Also, the blade holder may be held in the apparatus using cap screws that engage both the blade holder and retainer member. As stated previously, the retainer and curing members may have any desired shape including curved and straight and their top or bottom surfaces may be flat, concave, or any other desired shape. In certain instances, the assembly of the apparatus may be fool proofed so that the sipe blade can be inserted into the curing member in only one orientation and/or may be inserted into the blade holder in only one orientation. Also, the assembly of the curing member, sipe blade, blade holder and retainer member subassembly into an apparatus may be fool proofed so that it will be installed in only one orientation. Also, means for visually indicating to an assembler that the components are being assembled incorrectly or correctly may be provided, alerting the assembler if he/she is assembling the apparatus correctly.

As can be seen, the apparatus and method of assembling the apparatus in accordance with the embodiments described herein provides a system for changing sipe blades with one configuration to another configuration, accommodating both two and three dimensional sipe blades, as well as for eliminating the presence of a sipe blade by using a dummy insert. It also helps to ensure that the correct sipe blade configuration is created preventing mold and press crashing as well as production scrap. Hence, certain embodiments of the present invention satisfy the needs mentioned earlier.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. An apparatus for molding or retreading a tire having sipes in its tread stock that facilitates sipe replacement comprising:

a curing member that has a top surface that contacts the tread of the tire and a bottom surface, said surfaces defining a first aperture;

a blade holder that that is configured to fit within the first aperture of the curing member, said blade holder having a top surface that contacts the tire tread and a body that defines a slit that has a predetermined configuration, said blade holder also having a heel with a top surface contacting the curing member and a bottom surface; and a sipe blade that has a first portion for forming a sipe in the tire tread and a second portion for retaining the blade within the apparatus comprising a heel with a top surface and a bottom surface, said second portion having a shape that is complimentary to the slit of the blade holder so that the sipe blade can fit within the blade holder.

2. The apparatus of claim 1 wherein said slit of the blade holder extends into the heel of the blade holder.

3. The apparatus of claim 2 wherein said second portion of the sipe blade is at least partially located within the heel of the blade holder and the top surfaces of the heels of the blade holder and sipe blade are coplanar and contact the curing member.

4. The apparatus of claim 3 wherein the blade holder comprises a clamp surface that is found above the bottom surface of its heel and the sipe blade also has a clamp surface that is found above the bottom surface of its heel.

5. The apparatus of claim 4 wherein the clamp surfaces of the blade holder and sipe blade are coplanar.

6. The apparatus of claim 5 wherein the clamp surfaces of the blade holder and sipe blade are coplanar with the top surfaces of the heels of the blade holder and sipe blade and wherein the distance from the top surface of the blade holder to its clamp surface is equal to the distance between the top surface and bottom surface of the curing member so that as the blade holder and sipe blade are inserted into the curing member, the clamp surfaces of the blade holder and sipe blade are flush with the bottom surface of the curing member and the top surface of the blade holder is flush with the top surface of the curing member.

7. The apparatus of claim 6 which further comprises a retainer member that has a clearance hole which clears the heels of the sipe blade and the blade holder and is clamped against the curing member while pressing onto the clamp surfaces of the blade holder and sipe blade.

8. The apparatus of claim 2 wherein the sipe blade has a side surface adjacent its heel and the blade holder has a side surface adjacent its heel, said side surface of the sipe blade extending past the side surface of the blade holder.

9. The apparatus of claim 1 wherein said blade holder has a body that defines a hole that passes through to said slit and wherein the sipe blade has a slot, said apparatus further comprising a stop member that is inserted into the hole of the blade holder and extends into the slit so that when the blade is inserted into the slit of the blade holder the slot receives the stop member.

10. The apparatus of claim 9 wherein the stop member is a roll pin.

11. The apparatus of claim 5 wherein the bottom surface of the curing member is coplanar with the bottom surface of the heels of the blade holder and sipe blade, said bottom surface of the curing member defining a cavity with a top surface that is coplanar with the clamp surfaces of the blade holder and sipe blade, said apparatus further comprising a retainer member which is disposed in said cavity and clamped onto the curing member while pressing onto the clamping surfaces of the blade holder and sipe blade.

12. The apparatus of claim 2 wherein said slit extends completely through the heel of the blade holder.

13. The apparatus of claim 1 wherein the curing member is a curing plate for use with a retread press.

14. The apparatus of claim 1 wherein the curing member is a mold sector with a concave curing surface.

15. The apparatus of claim 1 wherein the sipe blade is a three dimensional sipe blade.

16. The apparatus of claim 9 wherein the hole of the blade holder is off-centered with respect to its body and the slot of the sipe blade is also off-centered with respect to its body.

17. The apparatus of claim 16 wherein the blade holder further comprises a first side surface that is adjacent to said first heel and a second heel and a second side surface, said first heel extending further from the first side surface than the second heel extends from the second side surface, said apparatus further comprising a second blade holder that is similarly configured to the first blade holder, said apparatus further comprising a curing member that has two apertures that are configured to receive the two blade holders in close proximity so that when one blade holder is inserted into one aperture of the curing member with the first heel being closest to the second aperture of the curing member, the second blade holder cannot be inserted into the second aperture with its first heel being closest to the first aperture because said heels interfere with each other, forcing the assembler to reverse the orientation of the second blade holder when inserting the second blade holder into the curing member.

18. The apparatus of claim 17 which further comprises a retainer that is mounted onto the curing member, said blade holders and sipe blade being sandwiched between the curing member and the retainer and wherein said curing member has a notch at one end and a bolt extending from the other end, said apparatus further comprising a second similarly configured curing member and retainer subassembly, said notches and bolts being configured so that as one curing member and retainer subassembly is inserted into a retread press or mold its notch will receive the bolt of the adjacent curing member and retainer subassembly.

19. An apparatus for molding or retreading a tire having sipes or lamellas with an undercut in the direction of draw that blends into a groove found in its tread stock comprising:
  a curing member that has a top surface that contacts the tread of the tire and a bottom surface, said surfaces defining a first aperture;
  a sipe blade that has a first portion for forming a sipe in the tire tread and a second portion that is contained within the apparatus, said first portion having an undercut in the direction of draw characterized by a male or female portion on the front surface of the sipe blade; and
  a first blade holder that has a body with a bottom curing surface and a first spire that rises from the bottom curing surface to a top curing surface, said blade holder having a front surface that is configured to mate with an interior surface of the aperture of the curing member and a rear surface with a male or female portion on the spire that is complimentary to the male or female portion of the undercut of the sipe blade when the rear surface of the first blade holder is pressed against the front surface of the sipe blade so that there is no gap between the blade and blade holder, preventing flash.

20. The apparatus of claim 19 wherein said sipe blade further comprises a rear surface that has an undercut in the direction of draw characterized by a male or female portion, said apparatus further comprising a second blade holder that has a body with a bottom curing surface and a first spire that rises from the bottom curing surface to a top curing surface, said second blade holder having a front face that is configured to mate with an interior surface of the aperture of the curing member and a rear surface with a male or female portion that is complimentary to the male or female portion of the rear surface of the sipe blade so that when the rear surface of the second blade holder is pressed against rear surface of the sipe blade there is no gap between the blade and second blade holder, preventing flash.

21. The apparatus of claim 20 wherein the undercut of the sipe blade extends across the entire width of the first portion of the sipe blade and wherein the first spires of the first and second blade holders are located adjacent the sides surfaces of the first and second blade holders, said spires also being adjacent to each other on either side of the blade in the assembled state.

22. The apparatus of claim 21 wherein the first blade holder further comprises a second spire that rises from the bottom curing surface to a top curing surface, said second spire also having a male or female portion that is complimentary to the male or female portion of the undercut of the sipe blade when the rear surface of the first blade holder is pressed against the front surface of the sipe blade and wherein the second blade holder further comprises a second spire that rises from the bottom curing surface to a top curing surface, said second spire also having a male or female portion that is configured to be complimentary to the male or female portion of the sipe blade when the rear surface of the second blade holder is pressed against the rear surface of the sipe blade.

23. The apparatus of claim 22 wherein the curing member has a projection for forming a recess or groove in the tire tread and wherein the aperture of the curing member extends into said projection leaving a void that is filled by the first spires when the sipe blade and blade holders are inserted into the aperture of the curing member.

24. The apparatus of claim 23 wherein the curing member has a second projection for forming a recess or groove in the tire tread and wherein the aperture of the curing member extends into said second projection leaving a void that is filled by the second spires when the sipe blade and blade holders are inserted into the aperture of the curing member.

25. The apparatus of claim 19 wherein the sipe blade comprises a heel that extends from its second portion and the blade holders also comprise heels, said heels of the blade holders and the sipe blade being coextensive so that they engage the curing plate at the same time, said sipe blade and blade holders also having clamp surfaces, said apparatus further comprising a retainer that clamps onto the curing member and presses onto the clamp surfaces of the sipe blade and blade holders.

26. The apparatus of claim 2 wherein the bottom surface of the heel of the sipe blade rests upon the top surface of the heel of the blade holder.

27. The apparatus of claim 26 wherein the second portion of the sipe blade further comprises a tab that extends below the heel of the sipe blade, said tab also fitting within the slit of the blade holder and being located below the top surface of the heel of the blade holder.

28. The method for assembling and disassembling an apparatus for molding or retreading tires comprising the following steps:
  providing a curing member with a top or curing surface, bottom surface and an aperture that extends from the top surface to the bottom surface;
  providing a blade holder with a slit found on its top or curing surface;

providing a sipe blade with a first portion for molding or forming a sipe in the tread stock of a tire and a second portion that fits within the slit of the blade holder;

inserting the sipe blade into the slit of the blade holder by passing the sipe blade through the curing surface of the blade holder;

inserting the sipe blade and blade holder into the aperture of the curing member; and retaining the blade holder and sipe blade in the curing member.

29. The method of claim 28 further comprising the following steps:

fool proofing the assembly of the sipe blade into the curing member so that the assembler knows that the sipe blade is oriented properly within the curing member; and fool proofing the assembly of the curing member and sipe blade into a mold or retread press so that the assembler knows that the sipe blade and curing member are oriented properly within the mold or retread press.

30. The method of claim 28 further comprising the following steps:

removing any means retaining the blade holder and sipe blade in the apparatus;

extracting the blade holder and sipe blade from aperture of the curing member; and extracting the sipe blade from the slit of the blade holder through its curing surface.

* * * * *